(12) United States Patent
Biswas et al.

(10) Patent No.: US 11,456,902 B2
(45) Date of Patent: Sep. 27, 2022

(54) DATA PACKET POSITION MODULATION SYSTEM

(71) Applicant: Board of Trustees of Michigan State University, East Lansing, MI (US)

(72) Inventors: Subir K. Biswas, Okemos, MI (US); Dezhi Feng, East Lansing, MI (US); Saptarshi Das, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 158 days.

(21) Appl. No.: 16/905,085

(22) Filed: Jun. 18, 2020

(65) Prior Publication Data
US 2020/0403831 A1    Dec. 24, 2020

Related U.S. Application Data

(60) Provisional application No. 62/864,025, filed on Jun. 20, 2019.

(51) Int. Cl.
*H04L 25/49*  (2006.01)
*H04W 72/04*  (2009.01)

(52) U.S. Cl.
CPC ..... *H04L 25/4902* (2013.01); *H04W 72/0446* (2013.01)

(58) Field of Classification Search
CPC .............. H04L 25/4902; H04W 72/0446
See application file for complete search history.

(56) References Cited

U.S. PATENT DOCUMENTS

| | | | | |
|---|---|---|---|---|
| 2005/0041691 | A1* | 2/2005 | Laufer | H03L 7/18 370/503 |
| 2008/0126825 | A1* | 5/2008 | Yang | H04N 21/4305 713/600 |
| 2020/0296406 | A1* | 9/2020 | Wang | H04N 19/105 |

* cited by examiner

*Primary Examiner* — Brenda H Pham
(74) *Attorney, Agent, or Firm* — Harness, Dickey & Pierce PLC

(57) ABSTRACT

A packet position modulation system includes a node configured to transmit a plurality of packets at corresponding time intervals. The node is configured to adjust, for at least one packet of the plurality of packets, the corresponding time interval to transmit the at least one packet. The system includes a base station configured to receive the plurality of packets from the node at corresponding time intervals, determine a difference between a previous time that a previous packet of the plurality of packets was received and a present time that a present packet of the plurality of packets was received, and recover coded data from the present packet based on the difference.

20 Claims, 21 Drawing Sheets

DATA PACKET POSITION MODULATION SYSTEM

CROSS REFERENCE

This application claims the benefit of U.S. Provisional Application 62/864,025, filed Jun. 20, 2019. The entire disclosure of the above application is incorporated herein by reference.

GOVERNMENT CLAUSE

This invention was made with government support under CNS1405273 awarded by the National Science Foundation. The government has certain rights in the invention.

FIELD

The present disclosure relates to transfer of information using data packet position modulation.

BACKGROUND

Transmit-only (Tx-only) networks have been proposed in recent years due to their wide application for low-power communication in industrial, human health monitoring, and smart-home. Tx-only sensors can significantly reduce the cost of deployment since Tx-only sensors are cheaper compared to regular sensors. From an implementation perspective, the Tx-only sensor node consumes less energy due to the absence of the receiving circuit.

This section provides background information related to the present disclosure which is not necessarily prior art.

SUMMARY

A packet position modulation system includes a node configured to transmit a plurality of packets at corresponding time intervals. The node is configured to adjust, for at least one packet of the plurality of packets, the corresponding time interval to transmit the at least one packet. The system includes a base station configured to receive the plurality of packets from the node at corresponding time intervals, determine a difference between a previous time that a previous packet of the plurality of packets was received and a present time that a present packet of the plurality of packets was received, and recover coded data from the present packet based on the difference.

In further aspects, the node includes a transmit time device configured to receive sensor data from a sensor of the node, determine a delay based on the sensor data, adjust the corresponding time interval based on the determined delay, and transmit the at least one packet in accordance with the adjusted time interval. In further aspects, the difference indicates the sensor data.

In further aspects, the system includes an intermediary node including a transceiver and a sensor. In further aspects, the intermediary node is configured to receive the plurality of packets from the node and forward the plurality of packets to the base station. In further aspects, the intermediary node includes an intermediary sensor configured to sense an environment condition at a location of the intermediary sensor.

In further aspects, the node is configured to select a reference interval and, in response to an energy level exceeding a threshold by: a present time equaling the reference interval less a next coded data, transmitting the present packet at the present time. In further aspects, the node is configured to, in response to the energy level being below the threshold by: the present time, transmitting the present packet at a postponed time, wherein the postponed time equals the reference interval plus the next coded data.

In further aspects, the next coded data is a next data multiplied by a packet duration. In further aspects, the reference interval is selected as greater than or equal to the corresponding time interval. In further aspects, the node includes a sensor and the plurality of packets include sensor data sensed by the sensor.

In further aspects, the base station includes a memory coupled to a processor. In further aspects, the memory stores instructions that, upon execution, cause the processor to recover the coded data and store the previous time that the previous packet of the plurality of packets was received. In further aspects, the base station includes a display configured to display the present packet and the recovered coded data.

A packet position modulation method includes transmitting, from a node, a plurality of packets at corresponding time intervals. The method includes adjusting, by the node, for a first packet of the plurality of packets, a first time interval that the first packet is transmitted and receiving, at a base station, the first packet of the plurality of packets from the node at the first time interval. The method includes determining a difference between a previous time that a previous packet of the plurality of packets was received and a present time that the first packet of the plurality of packets was received and recovering coded data from the first packet based on the difference.

In further aspects, the method includes storing the present time that the first packet of the plurality of packets was received as the previous time that the previous packet of the plurality of packets was received. In further aspects, the method includes receiving, at the node, sensor data from a sensor of the node, determining a time delay based on the sensor data and a remaining energy level, adjusting the first time interval of the first packet based on the determined time delay, and transmitting the first packet at the first time interval.

In further aspects, the difference indicates the sensor data. In further aspects, the method includes receiving, at an intermediary node, the first packet from the node and forwarding, from the intermediary node, the first packet to the base station. In further aspects, the intermediary node includes an intermediary sensor configured to sense an environment condition at a location of the intermediary sensor.

In further aspects, the method includes generating an intermediary packet including the first packet and the environment condition sensed at the location of the intermediary sensor. In further aspects, the environment condition is included in the intermediary packet as the coded data. In further aspects, the method includes forwarding, from the intermediary node, the intermediary packet to the base station.

A packet position modulation system includes a node configured to transmit sensor data at corresponding time intervals. The node includes a sensor and a transmit time device. The transmit time device is configured to receive sensor data from the sensor, determine a delay based on the sensor data and a remaining energy level, adjust the corresponding time interval based on the delay, and transmit the sensor data in accordance with the adjusted time interval. The system includes a base station configured to receive sensor data from the node at the corresponding time interval.

The base station includes a memory coupled to a processor. The memory stores instructions that, upon execution, cause the processor to determine an actual period between receiving previous sensor data and the sensor data and calculate the sensor data based on the actual period.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

A packet position modulation (PPM) system or data PPM (DPPM) modulates data information in terms of inter-packet intervals without consuming any extra energy for Tx-only sensor networks and Internet of Things (IoTs) applications with thin energy budgets. The DPPM paradigm of the present disclosure is designed to enhance information capacity of ultra-low-bandwidth communication links used by energy-constrained sensors and IoTs. Packet data transmissions in wireless sensor networks are often scheduled at regular intervals to reflect sampling requirements, energy harvesting power availability, etc. In such applications, especially in energy-constrained scenarios, the time gap between consecutive packets is much larger (>100 times) than the packet duration. The core idea of the proposed DPPM is to leverage such large inter-packet spacing for coding additional information without incurring any additional transmission energy expenses. Unlike prior capacity enhancement coding methods, the DPPM architectures improve the information transfer capacity of sensor networks without causing any extra energy consumption and the complexity of hardware design. Analytical models and simulation results have been provided for the information transfer capacity improvement expectations.

Figure 1:
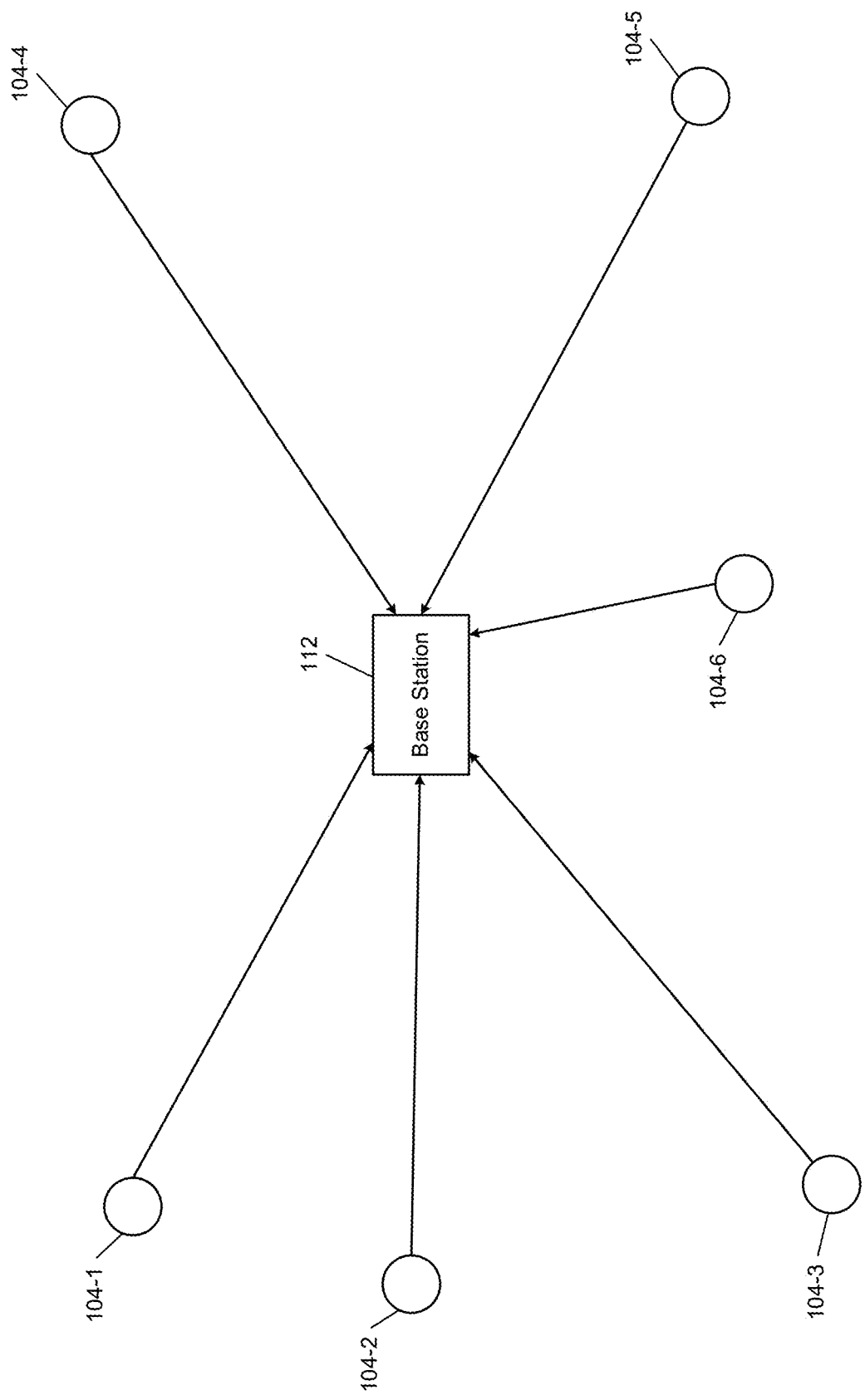
FIG. 1 is a high-level network diagram of an example transmit-only (Tx-only) network.

Referring to FIG. 1, an example transmit-only (Tx-only) network is shown. A plurality of Tx-only nodes 104-1, 104-2, 104-3, 104-4, 104-5, and 104-6, collectively 104, are deployed massively to sense an environment and transmit packets to a base station 112. In various implementations, one or more cluster heads may act as intermediaries to forward sensed data from the Tx-only nodes 104 to the base station 112. Additionally, the cluster heads can also include environment sensors to collect environment sensor data. The cluster heads are either wired or equipped with more complex, full-duplex radios. The cluster heads may include a processor and associated memory for storing or analyzing/organizing data received from the Tx-only nodes 104. The cluster heads may also include a receive antenna for communicating with the Tx-only nodes 104.

In various implementations, the Tx-only nodes 104 include an environment sensor, for example, for sensing a temperature, a transmit antenna, and a small battery or simple energy harvesting device. Packet transmissions in such a Tx-only sensor network are often scheduled for transmission in regular time periods or intervals to reflect sampling requirements or energy harvesting power availability. In such applications, the amount of information transmitted is constrained by battery or harvested energy. The data rate is relatively low and the duration between consecutive packets is much larger (>100 times) than the packet duration in order to maintain a long lifetime operation. It is always a challenge to enhance information capacity and throughput under limited energy.

Another major challenge faced in a Tx-only system is the chance of packet collision. Due to the difficulty of synchronization and coordination between Tx-only sensor nodes, there is a high probability of collision in a multi-access environment. A high collision rate will have a significant impact on the information transfer capacity of the system. It is therefore important to consider the chances of collision for maximizing the information transfer capacity.

The presently described packet position modulation (PPM) mechanism is based on the modulation of inter-packet intervals for zero-energy data transmission in Tx-only sensor networks and IoT applications driven with thin energy budget. Taking advantage of the inter-packet spacing to encode additional data information in terms of the time interval between consecutive packets, PPM does not incur any extra energy expenses.

Wireless sensor networks (WSNs) have been successfully used to support various applications. WSNs consist of small sensing devices that detect and respond to various types of input from the physical environment. Among the research towards improving information capacity in WSNs, a significant disadvantage of multi-hop networks is the complexity of software protocols required to manage the network. Software protocols must manage the synchronization of sensing nodes, the discovery of neighboring nodes, maintenance of multi-hop routes through the network and fault tolerance for noisy node-to-node radio communication. Protocols for multi-hop environments must be highly fault-tolerant and able to re-transmit lost packets. Conversely, they must also maximize energy efficiency by avoiding unnecessary retransmissions of messages. As in the case of wireless networks, limited information capacity and battery life are the main challenges. Among the research, the information transfer capacity has been improved significantly and the protocols are designed accordingly for increasing the energy-efficiency. However, such research is based on the physical layer sensing capacity and multi-channel communication, which provides a high requirement for hardware design and implementation.

Tx-only sensors network, as one category of sensor networks, have been proposed in recent years based on the fact that Tx-only sensors are significantly cheaper and simpler to build as well as being more reliable than a traditional multi-hop sensor network. It is concluded that a Tx-only network can achieve equivalent performance to a network with transceiver nodes but at a much lower dollar cost for the hardware and for lower power consumption. Moreover, Tx-only-based single-hop configuration includes no need for routing considerations and therefore simpler protocol stack, lower delay, simpler time synchronization, and the possibility of using centralized media access control.

DPPM architecture is designed based on the modulation of inter-packet silence duration. An algorithm is deduced for maximum information capacity based on the consideration of multiple design parameters, such as sensor density, energy utilization rate, hardware parameters, and packet length, etc. Unlike prior coding methods for improving information transfer capacity, the proposed DPPM method and the corresponding MAC protocol described are differentiated in terms of zero extra energy consumption and no need for receiving circuit on sensor nodes, such as the Tx-only nodes 104 in FIG. 1.

Further, information capacity is improved when implementing DPPM by making the best use of limited battery or harvested energy. The mechanism can be implemented into application-specific low-power sensor networks and IoT systems for impressive gains in the information transfer capacity, especially in sensor networks powered with slow energy-harvesting sources.

Figure 2:
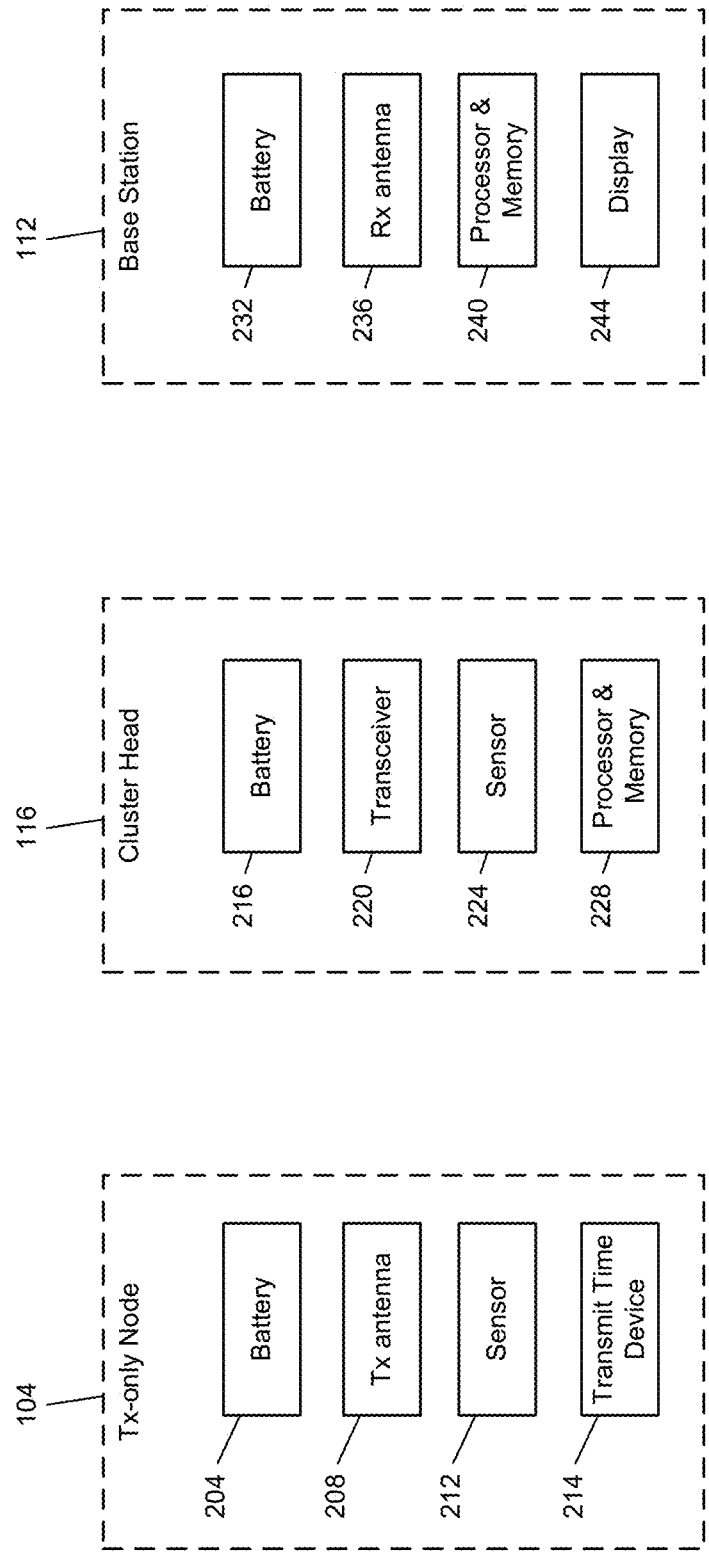
FIG. 2A is an example Tx-only node.
FIG. 2B is an example cluster head.
FIG. 2C is an example base station.

Referring to FIG. 2A, an example Tx-only node 104 described in FIG. 1 is shown. The Tx-only node 104 includes a battery 204, a transmit antenna 208, a sensor 212 for sensing an environmental condition, and a transmit time device 214. The transmit time device 214 is configured to convert data information sensed by the sensor 212 into a time delay that is either before or after the predetermined interval at which the data information is transmitted to the cluster head. In various implementations, the Tx-only node 104 transmits data information from the sensor 212 directly to the base station 112 at the predetermined time interval with the time delay corresponding to the data information.

In FIG. 2B, an example cluster head 116 is shown. In various implementations, the cluster head 116 may receive packets from the Tx-only node 104 and forward the packet to the base station 112. In other words, the cluster head 116 may act as an intermediary. The cluster head 116 includes a battery 216, a transceiver 220, a sensor 224, and a processor and associated memory 228. In various implementations, the cluster head 116 may exclude the processor and associated memory 228 and simply forward sensor data receiver from the sensor 212 of the Tx-only node 104 to the base station 112 via the transceiver 220. Referring to FIG. 2C, an example base station 112 described in FIG. 1 is shown. The base station 112 includes a battery 232, an Rx antenna 236, and a processor and associated memory 240. In various implementations, the batteries included in the Tx-only node 104, the cluster head 116, and/or the base station 112 may be energy harvesting devices.

The processor and memory 240 of the base station 112 is configured to identify the time delay based on a difference between an expected time the base station 112 will receive data information and when the base station 112 does receive the data information. Based on the difference, the processor and memory 240 can determine the additional information of the sensor 212 being transmitted using the time delay. The base station 112 may also include a display 244, through which a user can view the additional information of the sensor 212 as well as view sensor data. In various implementations, the base station 112 is a computing device or a mobile computing device that can store and collect sensor data for further analysis.

The DPPM paradigm is to enhance information transfer capacity of communication links used by energy-constrained devices. Packet transmissions in low duty cycle networks are often scheduled as time-division multiple access (TDMA) slots, whose periodicity is determined based on application sampling requirements and the energy in-flow, often in the form of energy harvesting. The key idea of DPPM is to modulate the inter-packet spacing for coding additional information without incurring additional transmission energy expenditures.

The DPPM based solution of the present disclosure is related to single-hop Tx-only networks in which a number of low-energy nodes transmit data to an aggregator. The architecture is first developed for a two-node point-to-point link, followed by a multipoint-to-point multi-access network. Detailed analytical and simulation models are developed to demonstrate the performance of a symmetric and an asymmetric version DPPM. By carefully choosing the protocol parameters, DPPM can enhance the effective information transfer capacity of an ultra-low duty cycle network by up to 65% in certain scenarios.

Additionally, low duty cycle networks have been extensively studied in the sensor network literature for their ability to provide energy-constrained data transport. Access control in such networks can be TDMA or asynchronous non-TDMA based. While the asynchronous approaches can operate in the absence of a centralized scheduling entity, they can suffer from energy wastage due to packet collisions which cannot be afforded in such energy-constrained networks. A TDMA-based approach, on the other hand, provides a collision-free solution for medium access for low-cost embedded transceivers. For both cases, the transmission duty cycle is very large when the energy inflow rate for a harvesting sensor is low.

Asymmetric Packet Position Modulation (APPM)

In a Tx-only network, the packet is normally transmitted at regular time intervals T. The minimum time interval between the end of the previous packet and the start of the present packet is normally hundreds of times greater than the packet duration. The sensor nodes go to sleeping mode during the inter-packet intervals for energy-saving. In other words, the wide inter-packet intervals can be used for data modulation by adjusting the transmission time of the next packets.

Therefore, the proposed DPPM system of the present disclosure works by shifting the position of a packet over time such that the amount of shift encodes additional information to be sent. Consider a scenario in which a sensor node sends packets to a base station at a regular interval T, which is the TDMA frame duration.

Figure 3:
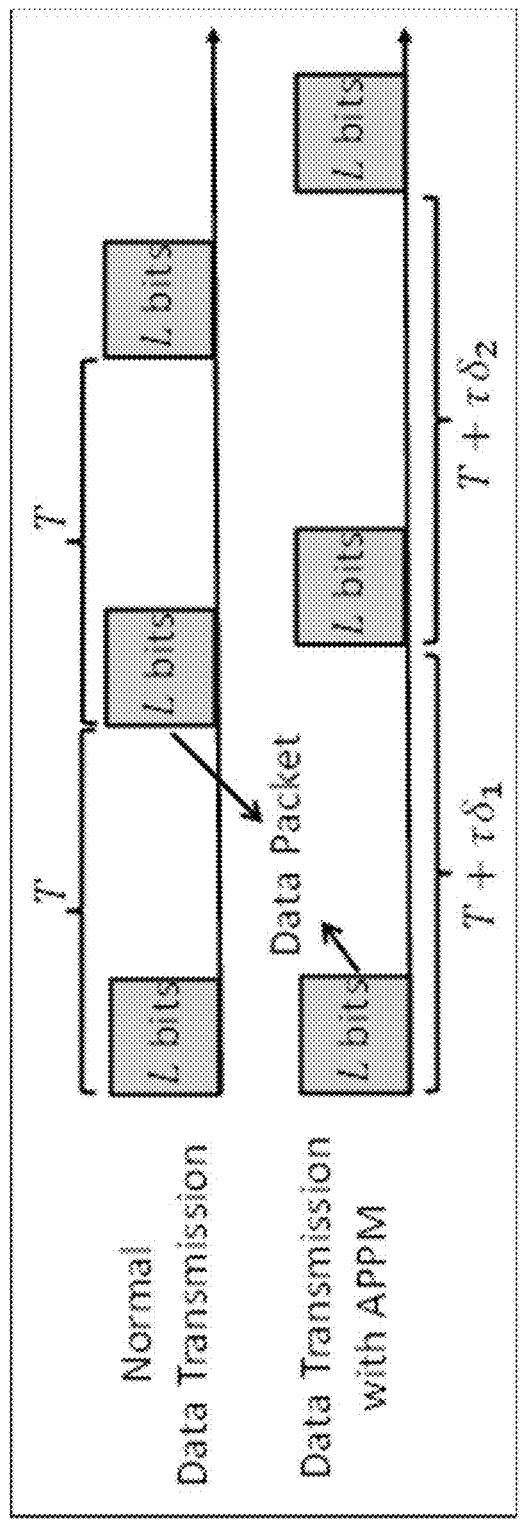
FIG. 3 is a block diagram depicting transfer of data packets using an example architecture of asymmetric packet position modulation (APPM).

Now consider an example implementation in FIG. 3, in which instead of transmitting packets at T intervals, each packet is postponed by $\tau\delta_i$ durations, where is the bit duration and $\delta_i$ (i=1, 2, . . . ) is the DPPM-coded data value. Since the base station expects a packet after T duration since the last received packet, it interprets the shift $\tau\delta_i$ as the additional DPPM-coded information. With L-bit packets, the baseline information transfer capacity is L/T bits per second. With DPPM as shown in FIG. 3, in addition to that baseline capacity, the node is able to send additional information values $\delta_1$ and $\delta_2$ by modulating the positions of the second and the third packets respectively. This increases the node's effective information transfer capacity (EITC) at no additional transmission energy costs. Formally stated, the capacity is enhanced from L bits in T duration to $L+\log_2^{\delta_i}$ bits in $T+\tau\delta_i$ duration.

Note that the bit durations in the inter-packet intervals can be different from packet bit duration $\tau$, and it should be chosen according to the accuracy of the clock within the sensor nodes. An accurate clock can increase the number of bits between packets for higher information capacity. For simplicity, the bit duration in the inter-packet intervals is also set as the same as packet bit duration $\tau$ for remaining discussion. The theoretical analysis can similarly be used for a different inter-packet bit length.

In APPM, it is assumed that the maximum delayed bit duration is $\Delta$ (in bit durations), which can represent the data within the range [0, $\Delta-1$]. Each data value i (i∈[0, $\Delta-1$]) is modulated as the delayed (i+1) bit durations. The data value is uniformly distributed within [0, $\Delta-1$]. For other distributions, the information transfer capacity of APPM can be deduced similarly according to the following procedures. The average time duration between the start bit of the previous packet and the start bit of the present packet is:

$$T_{avg} = T + \frac{1+\Delta}{2} \cdot \tau = \frac{L \cdot E}{W} + \frac{1+\Delta}{2} \cdot \tau. \quad (1)$$

The average encoded data information per packet in terms of bit can be divided into two parts, one is L bits packet itself, and the other part is the extra bit information with APPM. The average encoded data information per packet is:

$$D_{avg} = L + \frac{\log_2 1 + \log_2 2 \ldots + \log_2 \Delta}{\Delta} = L + \frac{\log_2(\Delta!)}{\Delta}. \quad (2)$$

The information transfer capacity can be deduced from Eq. (1) and Eq. (2) as:

$$C_{APPM} = \left(L + \frac{\log_2(\Delta!)}{\Delta}\right) / \left(\frac{L \cdot E}{W} + \frac{1+\Delta}{2} \cdot \tau\right). \quad (3)$$

Figure 4A:
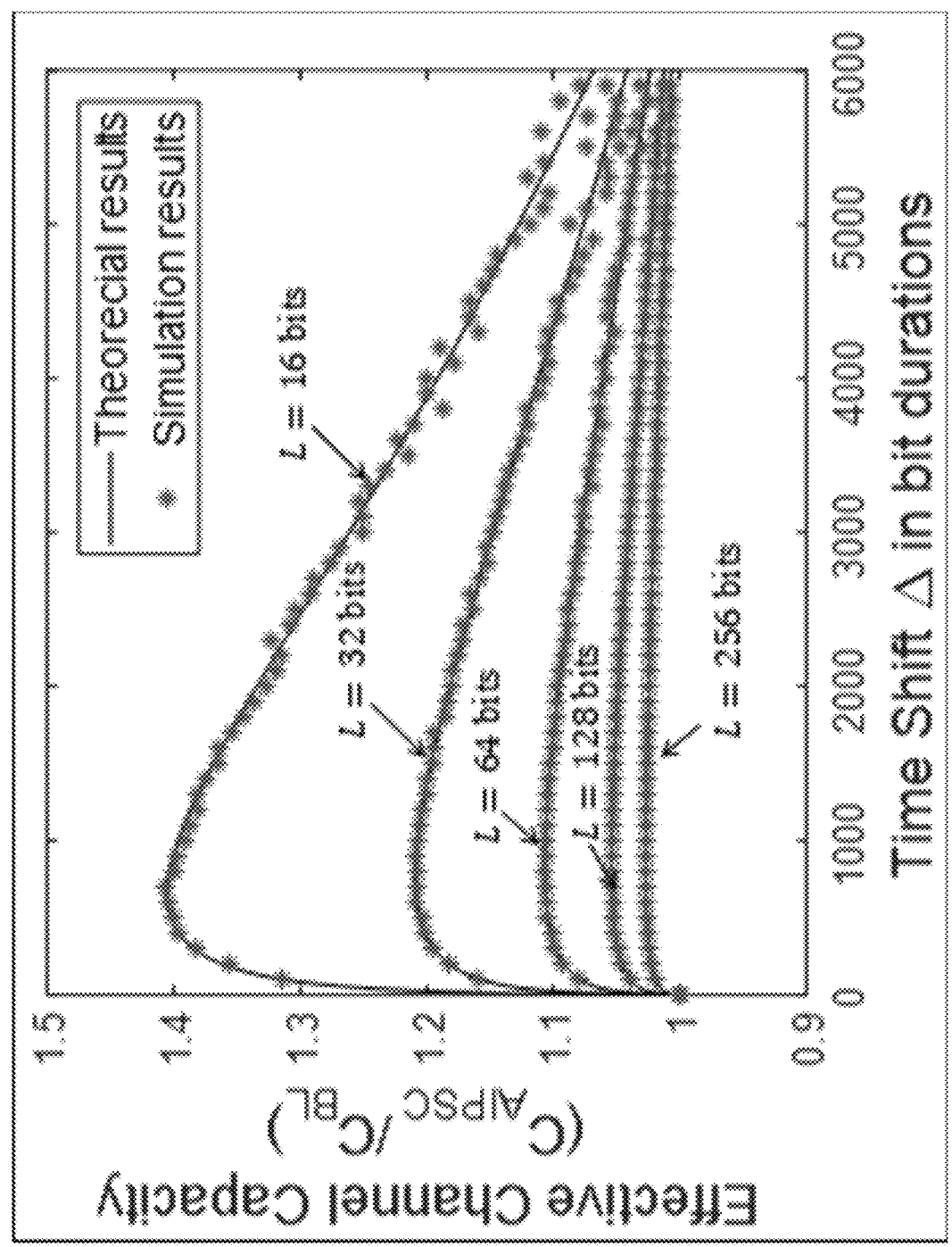
FIG. 4A is a graphical depiction of example effective information capacity of APPM when using different packet lengths.

The ratio of $C_{APPM}$ to the baseline information capacity $C_{BL}$ is defined as Effective Channel Capacity (ECC) $\eta=C_{APPM}/C_{BL}$. Referring to FIG. 4A, ECC with both the theoretical results and the simulation results under the different length of the packet with a single Tx-only node/sensor is shown. For an energy utilization rate W=0.1 mW, the information transfer capacity of APPM can achieve 20% to 40% improvement compared to the baseline information capacity when L is small, for example, L=16, 32.

Figure 4B:
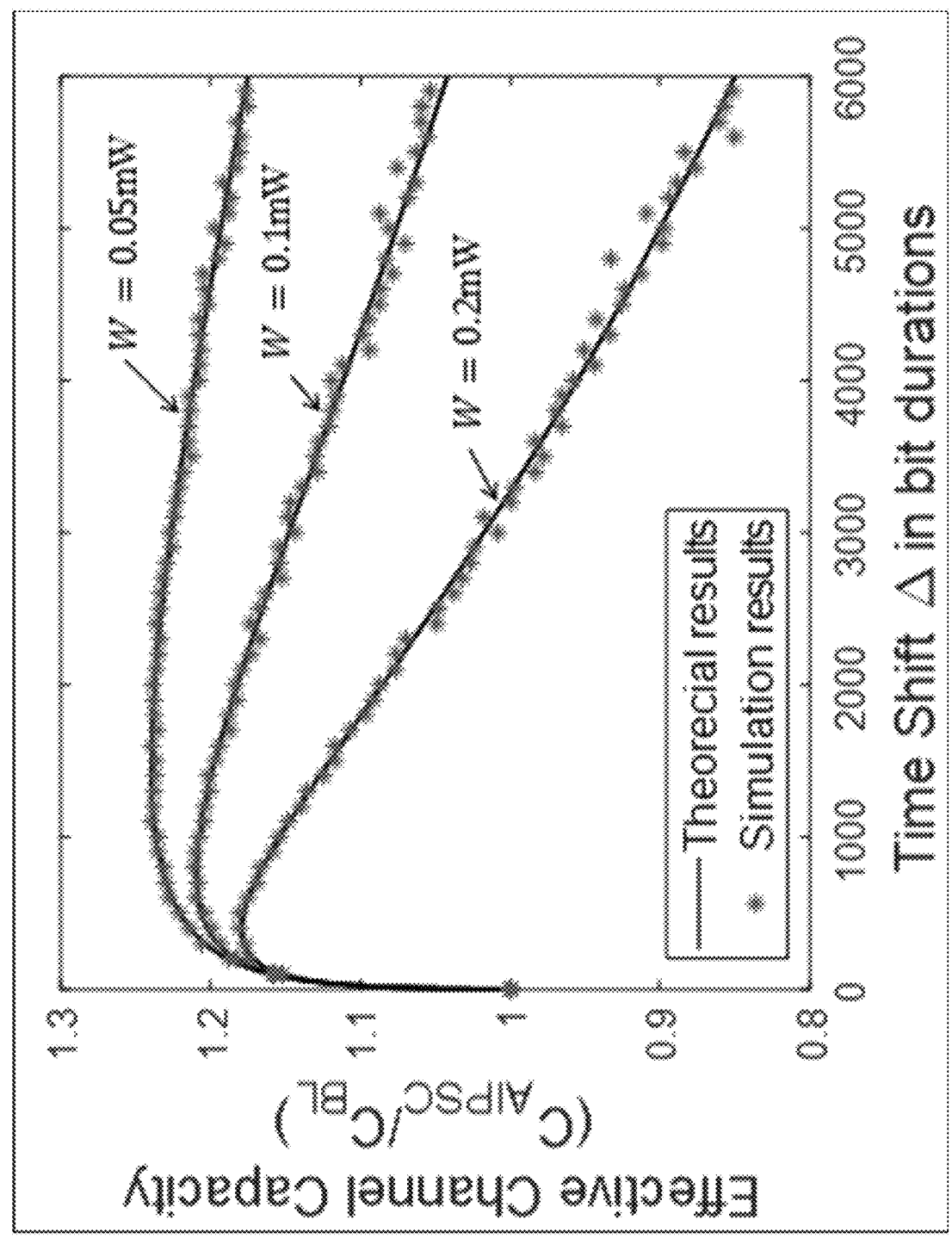
FIG. 4B is a graphical depiction of example effective information capacity of APPM when using different energy utilization rates.

FIG. 4B shows the simulated and the theoretical ECC with packet length L=32 bits under different energy utilization rates. Note that the maximum inter-packet interval used in the simulation is T=5 seconds, which is a relatively small inter-packet interval compared with the real application. A relatively smaller utilization rate leads to a larger time interval T between packets, which APPM can take advantage of for achieving a higher information transfer capacity.

Figure 5:
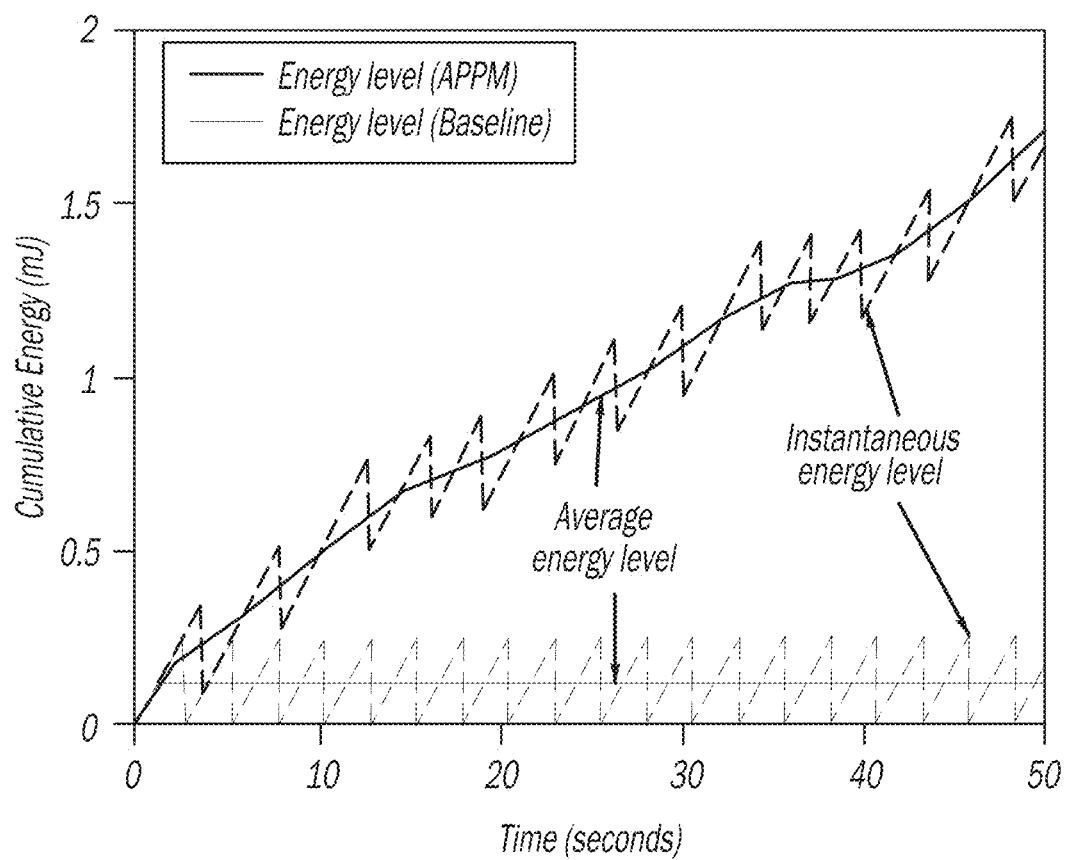
FIG. 5 is a graphical depiction of an instantaneous and average energy level of APPM and baseline.

However, APPM postpones each packet for improving information capacity. The average delay for each packet is $$t_{APPM} = \frac{1+\Delta}{2} \cdot \tau,$$

which cannot be avoided in APPM process. Simultaneously, the latency of data transmission saves the extra cumulative energy which is not used for improving information capacity. FIG. 5 shows the instantaneous energy level and the average energy level within a sensor node with L=16 bits and W=0.2 mW. According to the simulation results in FIG. 5, the average energy level keeps increasing with each packet transmission.

Symmetric Packet Position Modulation (SPPM)

A new coding scheme, SPPM, is based on APPM that further improves information transfer capacity. Assume that inter-packet interval T' is predefined by a sensor network, such as the network described with respect to FIG. 1. The value of T' can be determined by the application requirement and energy utilization rate. The minimum value of T' is the baseline inter-packet interval T, namely, T'≥T=L·E/W. SPPM is designed as shown in FIG. 6.

A Tx-only node depends on the energy utilization rate to arrange the schedule for the next packet transmission. For example, as shown and described in FIG. 2A, the transmit time device 214 included in the Tx-only node 104 is configured to determine the packet transmission schedule and adjusts transmissions to correspond to the data that is being transmitted. Then, the processor and memory 228 of the base station 112 converts the adjusted transmission schedule back into the data to which it corresponds. In this way, the Tx-only node 104 can convert data into a schedule and the base station 112 can convert the transmission schedule deviation back into the data from the Tx-only node 104.

If the energy can be cumulated sufficiently from the present until the time $T'-\tau\delta_i$ (where $\delta_i$ is an arbitrary data vale) for sending a packet, the transmitter will send the packet at the time $T'-\tau\delta_i$. Otherwise, the next packet will be sent at the time $T'+\tau\delta_i$. The receivers can modulate the data information from the predefined reference time interval $T'$. If the packet is received before the end of time duration $T'$, the packet has been preponed (brought forward). Otherwise, the packet has been postponed.

Figure 6:
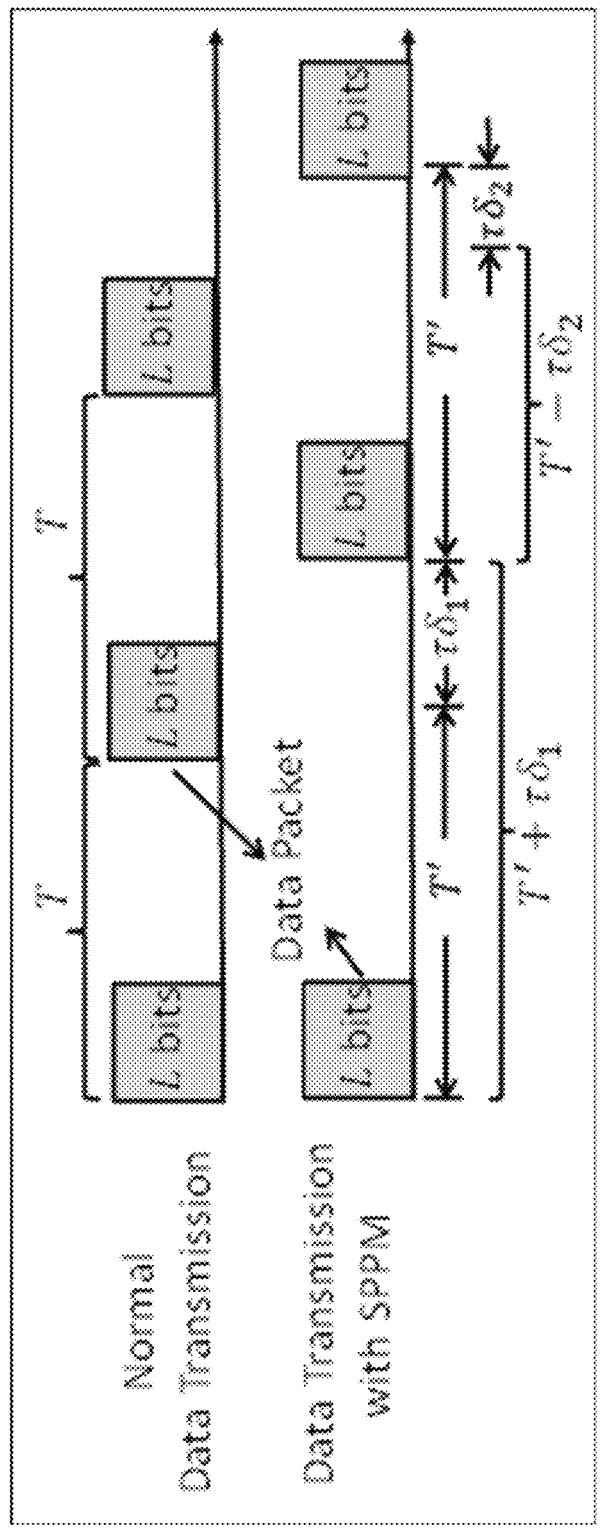
FIG. 6 is a block diagram depicting transfer of data packets using an example architecture of symmetric packet position modulation (SPPM).

FIG. 6 shows an example of SPPM architecture. For data value (1, the sensor node does not cumulate enough energy for preponing the packet. Thus, the packet is postponed for time duration $\tau\delta_1$. But for the second packet transmission, enough energy has been stored for sending the packet earlier. The second packet is preponed for time duration $\tau\delta_2$ before the end of time $T'$.

In each packet transmission, energy can be efficiently used in SPPM for scheduling and transmitting the packet. Simultaneously, delay can be alleviated from the early transmission (prepone) of the packet. Assume that $\Delta$ is the time shift bit duration for SPPM, and $\Delta \leq T'/\tau$. An arbitrary data value $\delta_i$ follows uniform distribution within the range of $[0, \Delta-1]$. There is an optimal $T'$ for maximizing information capacity. The calculation of the optimal $T'$ can be realized as follows that, when $T' \leq T$, since the baseline inter-packet interval $T$ is determined by the energy utilization rate $W$ and hardware setup, namely that $T = L \cdot E/W$. In SPPM, a sensor node can store the extra energy when after postponing a packet. The stored energy can be used for preponing of next packet. Even though $T' \leq T$, the overall average inter-packet interval is still $T$, because $T$ is, on average, the minimum inter-packet interval based on energy utilization. A sensor node has more than 50% probability to postpone the packet and less than 50% probability to prepone the packet. The average encoded data information per packet is $$D_{avg} = L + \frac{\log_2(\Delta!)}{\Delta},$$

which is the same as the one in APPM. Therefore, the information transfer capacity of SPPM is $$C_{SPPM} = \left(L + \frac{\log_2(\Delta!)}{\Delta}\right) / \frac{L \cdot E}{W}. \quad (4)$$

Then, when $$T < T' \leq \left(\frac{2L \cdot E}{W \cdot \tau} - 2L + 1\right)\tau,$$

if the reference interval $T'$ in SPPM is greater than $T$, the cumulated energy after $T'$ time period is greater than the required energy for sending a packet. Thus, a sensor node can be more likely to prepone a packet than postpone a packet. In the extreme case, $T'$ is large enough that all the packets can be sent in the preponing mode. When $$T' = \left(\frac{2L \cdot E}{W \cdot \tau} - 2L + 1\right)\tau,$$

after all the packet has been preponed, the average inter-packet interval is equal to baseline $T$. However, the average inter-packet interval is constrained by the energy utilization rate, and it cannot be less than $T$. Therefore, the average inter-packet interval $T_{avg}$ is still $T$ and the information transfer capacity is equal to:

$$C_{SPPM} = \left(L + \frac{\log_2(\Delta!)}{\Delta}\right) / T. \quad (5)$$

When $$T' = \left(\frac{2L \cdot E}{W \cdot \tau} - 2L + 1\right)\tau \text{ and } \Delta = \frac{2L \cdot E}{W \cdot \tau} - 2L + 1,$$

the information transfer capacity achieves the maximum value with the maximum data transmission load in $T$ time period.

Further, when $$T' > \left(\frac{2L \cdot E}{W \cdot \tau} - 2L + 1\right)\tau,$$

since the reference interval $T'$ in SPPM is large enough that all the data can be preponed, the average inter-packet interval is $$T_{avg} = T' - \left(\frac{\frac{T'}{\tau} + 1}{2} - L\right).$$

Therefore, the inter-packet interval is greater than $T$. The information transfer capacity in this case is:

$$C_{SPPM} = \left(L + \frac{\log_2(\Delta!)}{\Delta}\right) / \left(T' - \left(\frac{\frac{T'}{\tau} + 1}{2} - L\right)\right) \quad (6)$$

The amount of modulated information is increasing because the increase of $T'$ leads to the increase of $$\Delta\left(\Delta = \frac{T}{\tau} - L\right),$$

which means a wider space for modulation. But, the average inter-packet interval is increasing faster than the amount of modulated information. The overall process incurs the decreasing of the information transfer capacity.

Figure 7A:
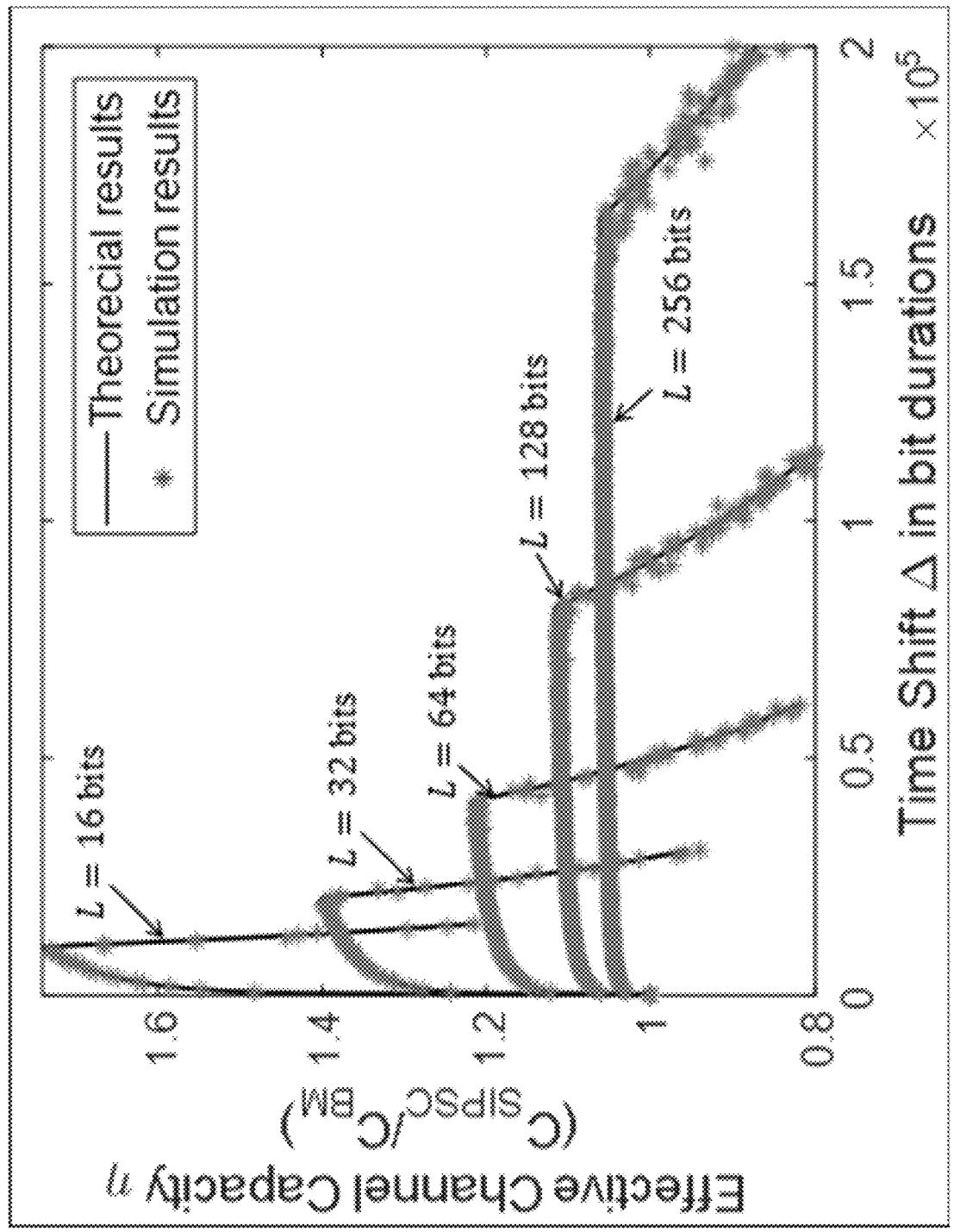
FIG. 7A is a graphical depiction of example effective information capacity of SPPM when using different packet lengths.

FIG. 7A shows ECC $$\left(\text{defined as } \eta = \frac{C_{SPPM}}{C_{BL}}\right)$$

with SPPM mechanism under energy utilization rate $W = 0.1$ mW for different length of packet. The simulation results agree well with the theoretical analysis. When $$\Delta = \frac{2L \cdot E}{W \cdot \tau} - 2L + 1,$$

the information capacity obtains the maximum value.

Figure 7B:
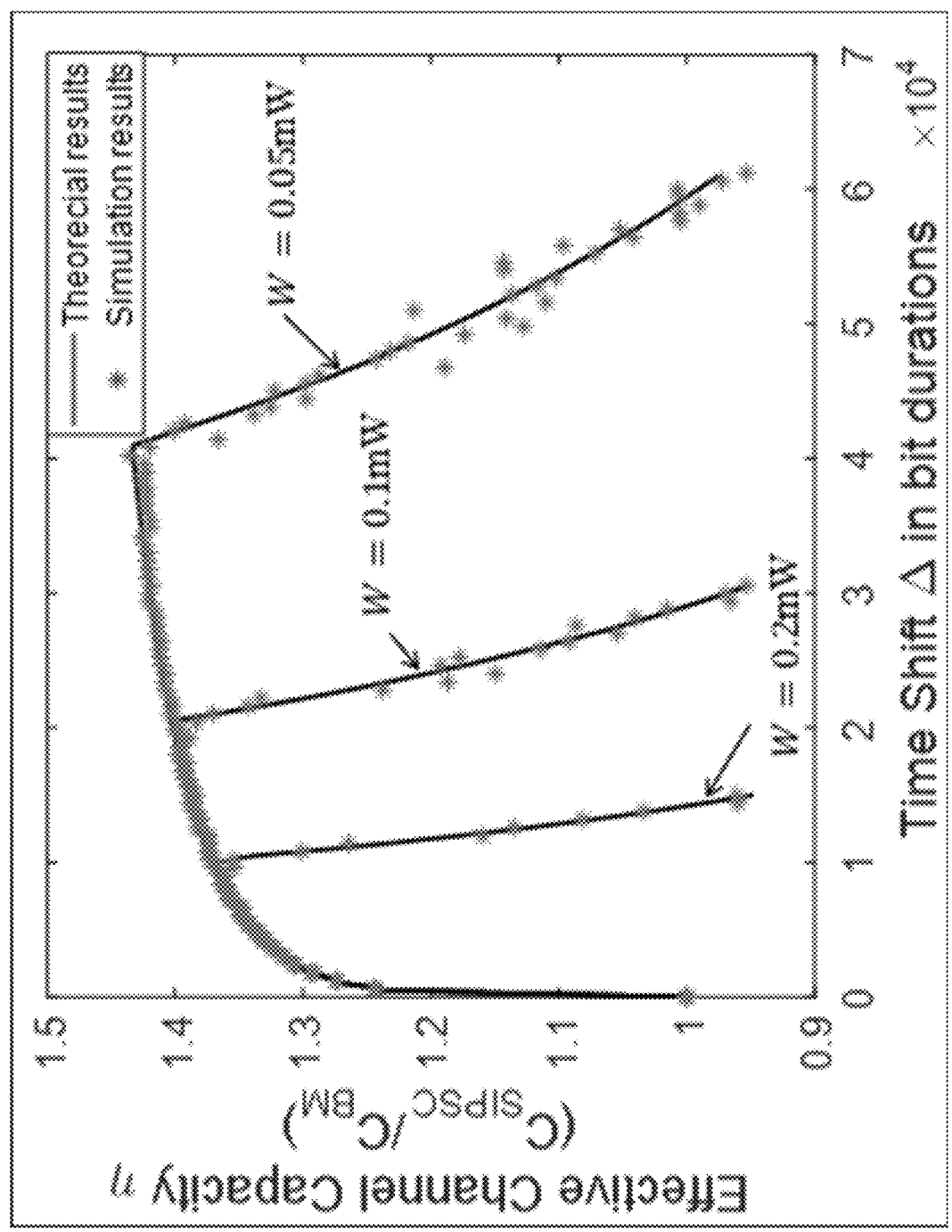
FIG. 7B is a graphical depiction of example effective information capacity of SPPM when using different energy utilization rates.

ECC using SPPM under packet length L=32 bits with different energy utilization rates is shown in FIG. 7B. It shows that the relatively smaller energy utilization rate can benefit the performance of SPPM information capacity. Compared with APPM, SPPM can achieve more than 15% improvement on information capacity.

Figure 8:
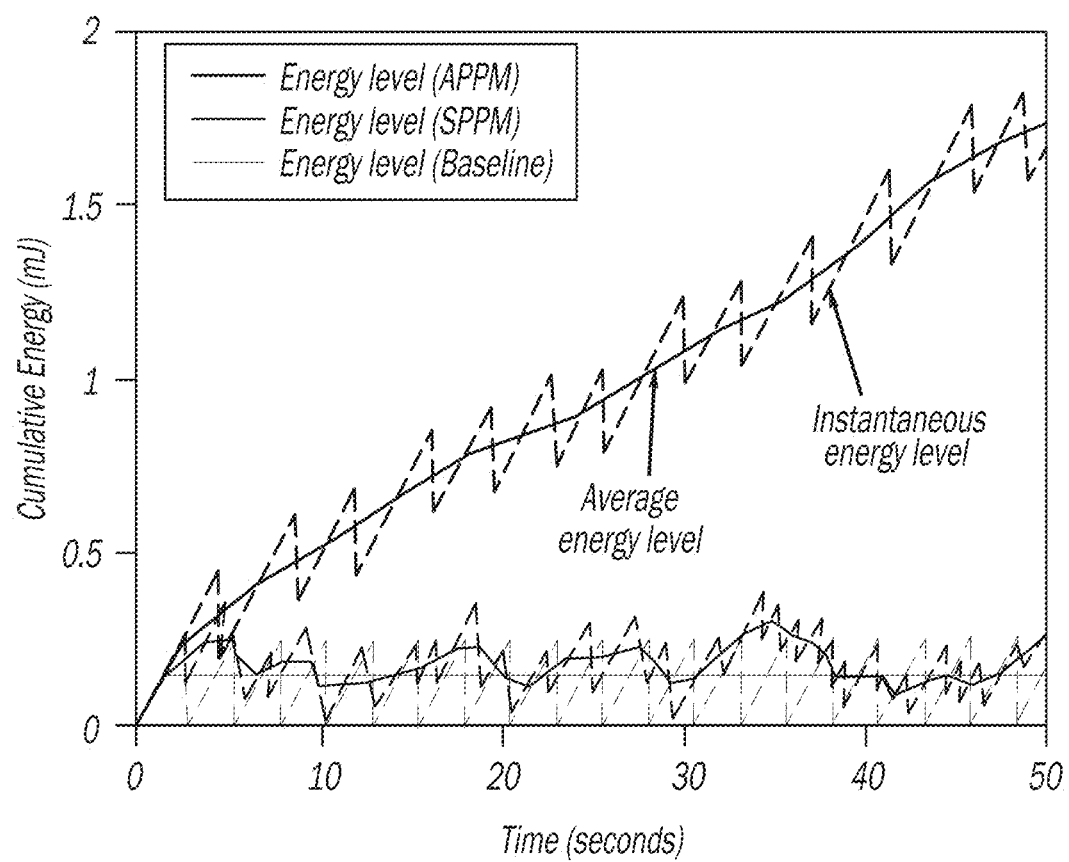
FIG. 8 is a graphical depiction of an instantaneous and average energy level of APPM, SPPM, and baseline.

FIG. 8 shows the instantaneous energy level and the average energy level within a sensor node with L=16 bits and W=0.2 mW. The average energy level of SPPM oscillates along the baseline curve. It can make the most of energy for scheduling packet transmission.

For further comparing the performance of SPPM with APPM, the relative energy ratio ($R_E$) is used to show the energy utilization, which is defined as the ratio of the remaining energy after each packet transmission ($E_i$) to the product of the packet sequence number (i) and each packet energy consumption ($E_{packet}$) in Eq. (7). Similarly, the relative delay ratio ($R_t$) is defined as the ratio of the time after sending each packet to the product of the packet sequence number (i) and the baseline inter-packet interval (T) as shown in Eq. (7).

$$\begin{cases} R_E = \frac{E_i}{i \cdot E_{packet}} \\ R_t = \frac{t_i}{i \cdot T} \end{cases} \quad (7)$$

Figure 9:
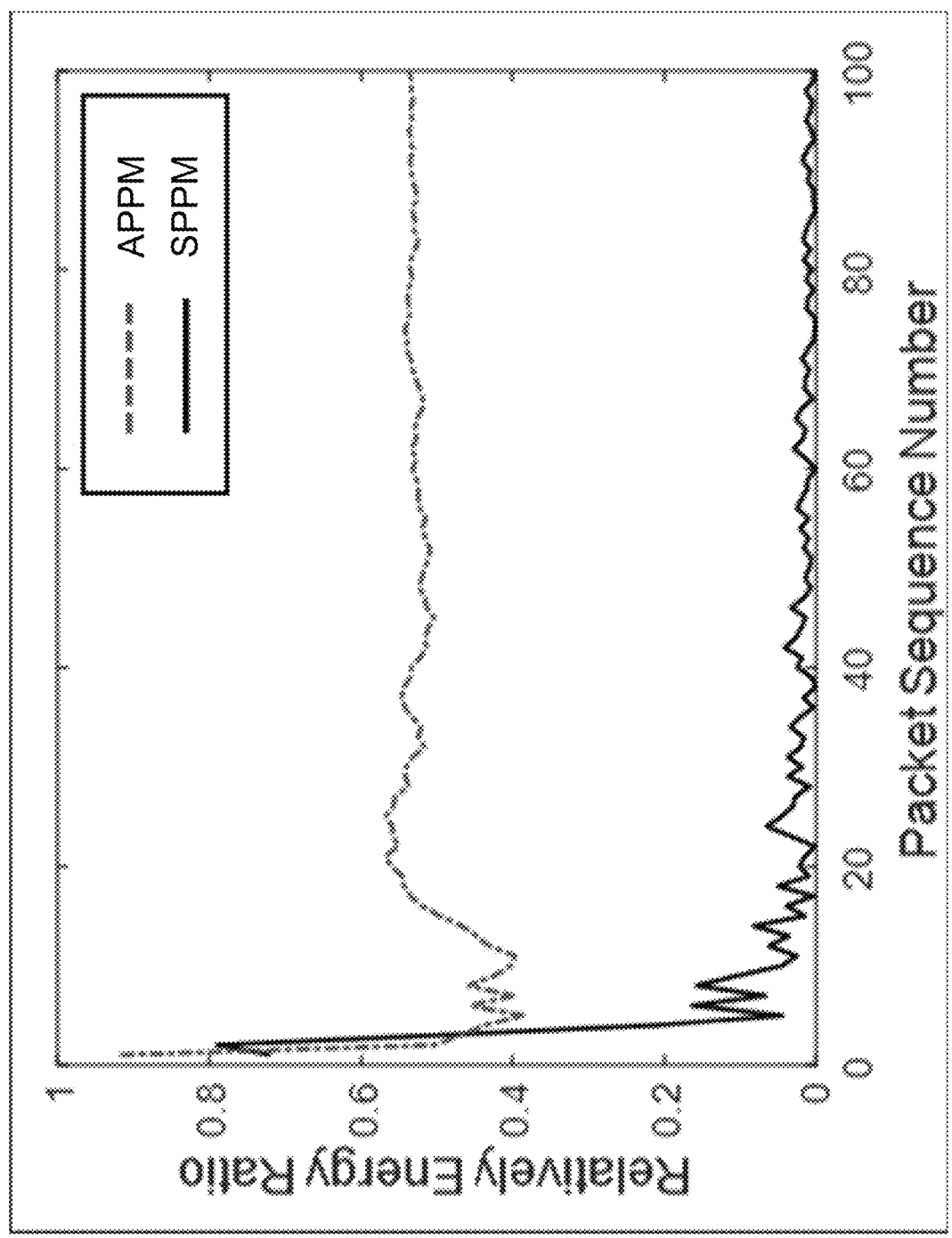
FIG. 9 is a graphical depiction of a relative energy ratio of APPM and SPPM.

FIG. 9 shows the relative energy ratio of APPM and SPPM with the same time shift $\Delta=10208$ bit durations $$\left(\Delta = \Delta_T = \frac{L \cdot E}{W \cdot \tau} - L\right)$$

under L=32 bits and W=0.1 mW. It can be seen that the relative energy ratio of SPPM converges to zero. Because after each packet transmission in SPPM, there is not enough energy left for immediately sending the next packet. On the contrary, the relative energy ratio of APPM converges to 0.5 because APPM retains the amount of energy $$\frac{\Delta+1}{2} W$$

compared to the baseline after each packet transmission on average and this amount of energy is not used for future packet transmission. In other words, SPPM can make the best use of energy for reasonably scheduling the packet transmission.

Figure 10:
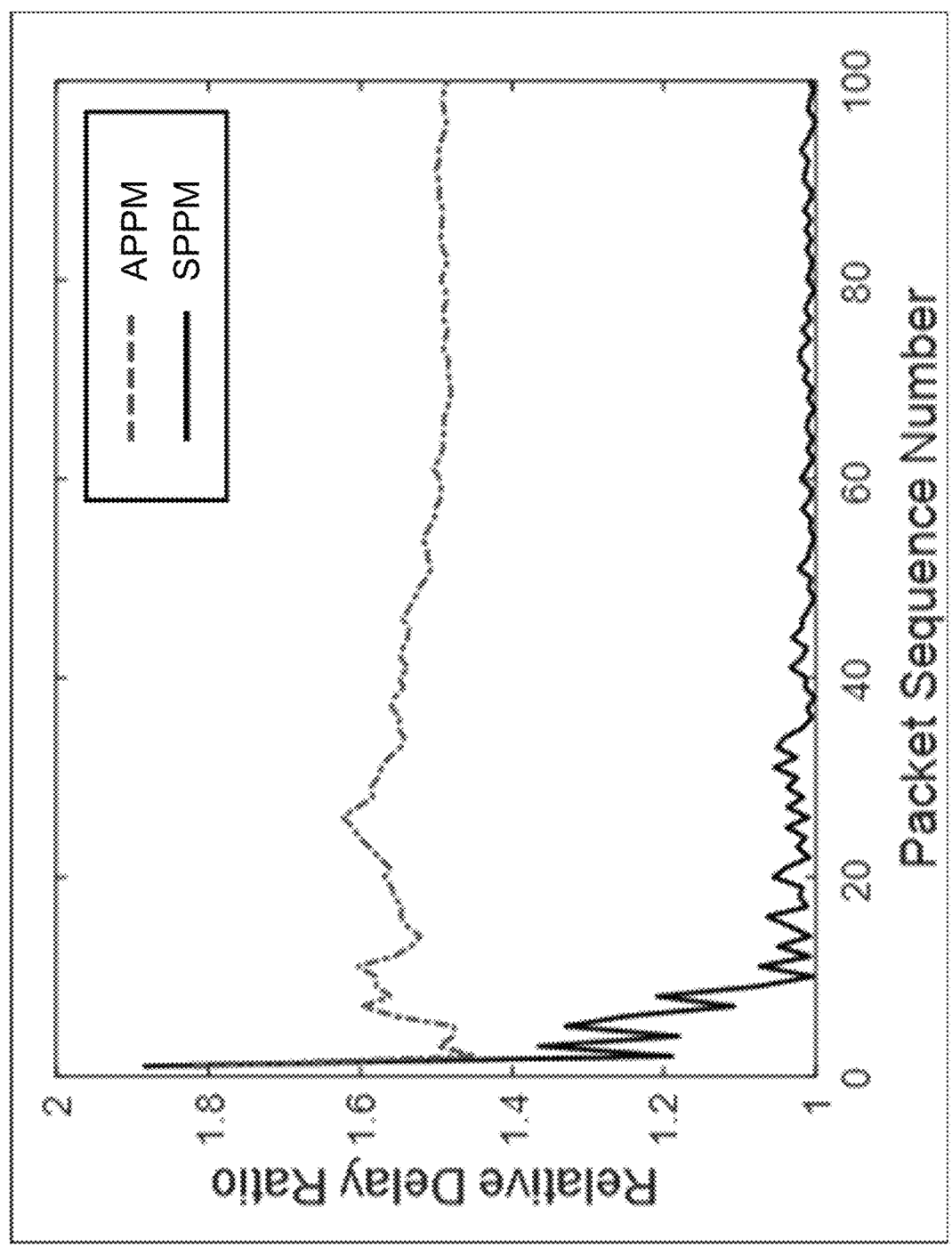
FIG. 10 is a graphical depiction of a relative delay ratio of APPM and SPPM.

FIG. 10 shows the relative delay ratio of APPM and SPPM with the same time shift parameter $\Delta=\Delta_T$. Since APPM incurs the time delay $$\frac{\Delta+1}{2}\tau$$

after each packet transmission, the delay ratio converges to the average delay after a certain number of packet transmission. The delay ratio of SPPM converges to zero due to the preponing transmitting of packets, which compensates the delay from postponing the packets. In various implementations, SPPM may achieve better performance on information capacity, energy utilization, and transmission delay than APPM.

Mac Layer Protocol Design for SPPM

The performance of SPPM is analyzed with a single transmitter so far. In various implementations, MAC layer protocols may be implemented for SPPM to enhance the information transfer capacity in a Tx-only network. Assume that N number of nodes in a Tx-only network. In order to avoid the collision of packets from different nodes, the inter-packet interval frame T (T=L·E/W) is divided into N number of slots. Each slot is assigned for each node. The packet from a specific node can only appear in the slot which is assigned for that node.

Figure 11:
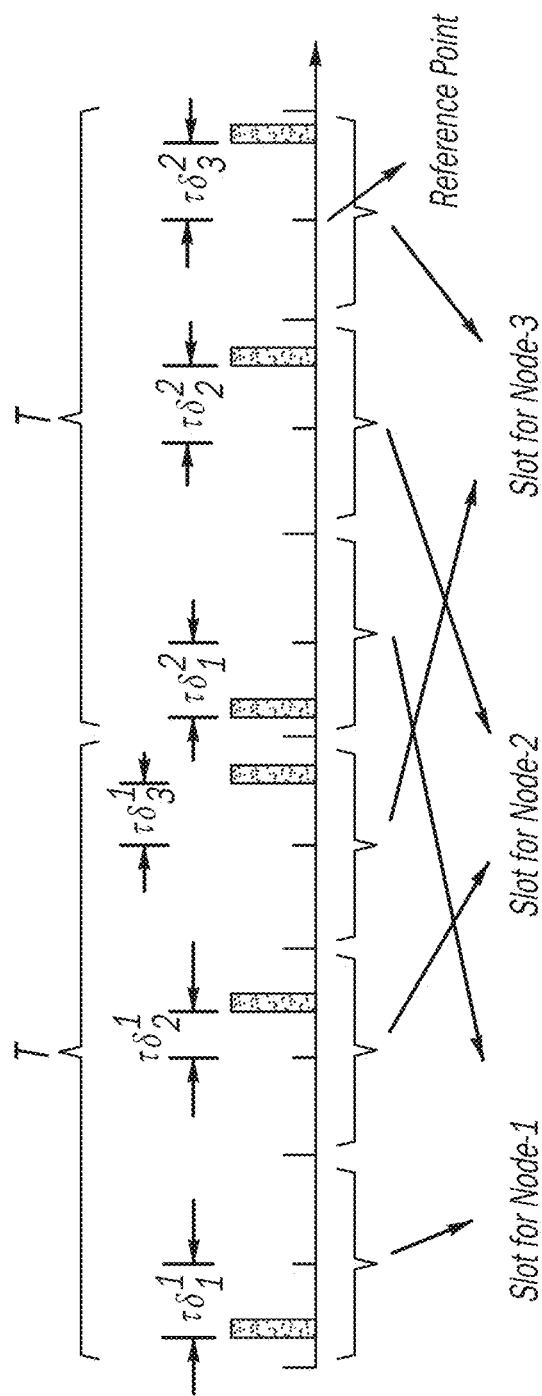
FIG. 11 is a time chart depicting an example of an SPPM protocol over pre-allocated time-division multiple access (TDMA) slots (SPPM-PAD) or a collision-avoidance slotted protocol without overlap.

FIG. 11 describes a schematic of an SPPM protocol over pre-allocated TDMA slots (SPPM-PAD) or a collision-avoidance SPPM without overlapping (CASPPM). For example, there are three nodes in a Tx-only network. Each node is assigned a unique slot for its own packet transmission. The middle point is reference point for SPPM purpose. The data is represented as the time interval between the received packet and the reference point. It is not possible that two packets appear in the same slot. Such a protocol can effectively avoid collision of packets from different nodes. The maximum time shifts that a node can use for SPPM is $$\left\lfloor \left(\frac{T}{N \cdot \tau} - L\right) \right\rfloor$$

in bit durations. The information transfer capacity per node is:

$$C_{SPPM}^{TDMA} = \left(L + \frac{\log_2\left(\left\lfloor\left(\frac{T}{N\cdot\tau} - L\right)/2\right\rfloor!\right)}{\Delta}\right) / \frac{L \cdot E}{W} \quad (8)$$

SPPM-PAD protocol increases the information transfer capacity by avoiding the expense of packet collisions. However, such a protocol cannot support a network with a large number of nodes, which dramatically decreases the space for SPPM and information capacity of the network. Moreover, SPPM-PAD necessitates a high synchronization requirement for the nodes within the network. The protocol assumes that all the nodes are synchronized to the bit level. In order to eliminate synchronization requirement and further enhance the information transfer capacity, a new MAC protocol is described below.

In a Tx-only network, the initial positions of the nodes are randomly distributed in a T' (T'≥T) time period. The nodes in the network are independent from each other. After a node sends a packet, the next packet is scheduled according its present packet location, either preponing or postponing the next packet.

The primary limitation of SPPM-PAD is that the amount of allowed shift is bounded to only half the slot duration in each direction, which limits the maximum possible information transfer capacity, especially at small node population. Also, the mechanism requires all nodes to be tightly absolute time-synchronized among each other and the base station. This is particularly challenging due to: a) high clock drifts in inexpensive embedded nodes, and b) lack of reception ability of the Tx-only nodes by periodically synchronizing with the base station. The following protocol addresses these.

Figure 12:
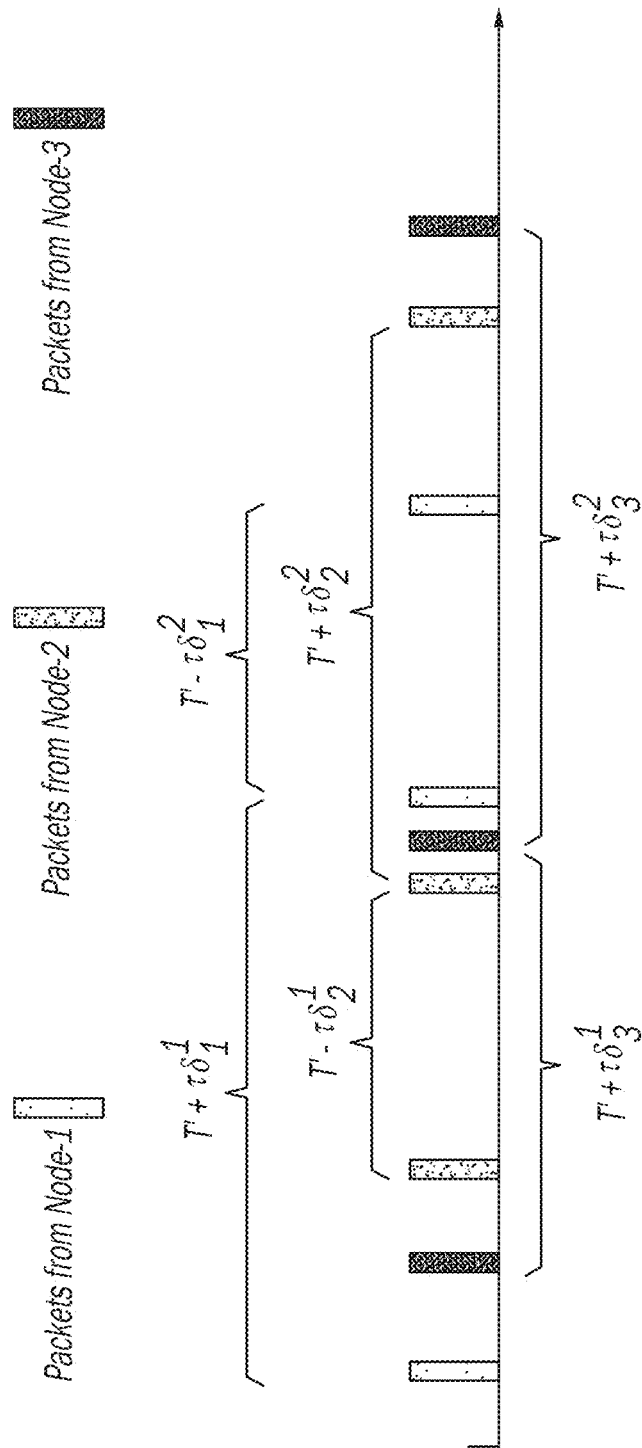
FIG. 12 is a time chart depicting an example of an SPPM protocol with implicit slotting (SPPM-WIS) or with overlap.

FIG. 12 shows an example of SPPM protocol with implicit slotting (SPPM-WIS). There is no explicit slot allocated to a node in this version. Rather, once a node picks a transmission time, it keeps sending packets periodically with the baseline interval $$T = L \cdot \frac{E}{W},$$

which depends on energy harvesting rate, packet length, and transmission energy budget. With this strategy, the nodes do not have to be absolute time synchronized with other nodes. It is sufficient to self-synchronize in a relative sense so that the receiver is able to measure any transmission time shift in order to decode the additional information coded by SPPM-WIS.

A node is allowed to shift (i.e., left or right depending on the energy availability) a transmission with respect to its last transmission time by up to the reference duration T' as defined and dimensioned above. Additionally, the preponing and postponing of transmissions based on available energy is performed the same way as presented above. An example operation of SPPM-WIS is shown in FIG. 12.

Unlike in SPPM-PAD, there can be collisions in SPPM-WIS. However, since the range of encoded data value is $$\left(\frac{T'}{\tau} - L\right),$$

which is larger than that in SPPM-PAD, this version can achieve a higher information transfer capacity, especially at smaller node populations. This advantage diminishes due to frequent collisions in larger networks. A detailed analytical model for the collision probability and performance of SPPM-WIS, along with an algorithm for choosing the optimal time shifts for the maximum information transfer capacity, are described later.

Since each node can use the whole frame to do packet position modulation, the range of encoded data values is enhanced compared with the previous MAC protocol. The sensor nodes in a Tx-only network can make the best use of time shifts duration between packets to achieve the maximum information capacity. However, such a strategy incurs the collision between the packets from different sensor nodes, which can reduce the information transfer capacity. An algorithm is developed to obtain the maximum information transfer capacity with a specific group of parameters (energy consumption per bit, packet size number of nodes, and energy utilization rate).

In order to obtain the maximum information transfer capacity, the collision probability for a specific group of parameters is analyzed. First, a transition matrix is used to describe the position of packets for the later analysis of collision probability. Time shift $$\Delta \left(\Delta \leq \frac{T'}{\tau}\right)$$

is used to encode the data value during SPPM. The time shift distance D is defined as the bit duration distance from the start of the presently modulated packet to the start of the corresponding baseline packet with the same sequence number as shown in FIG. 13.

Figure 13:
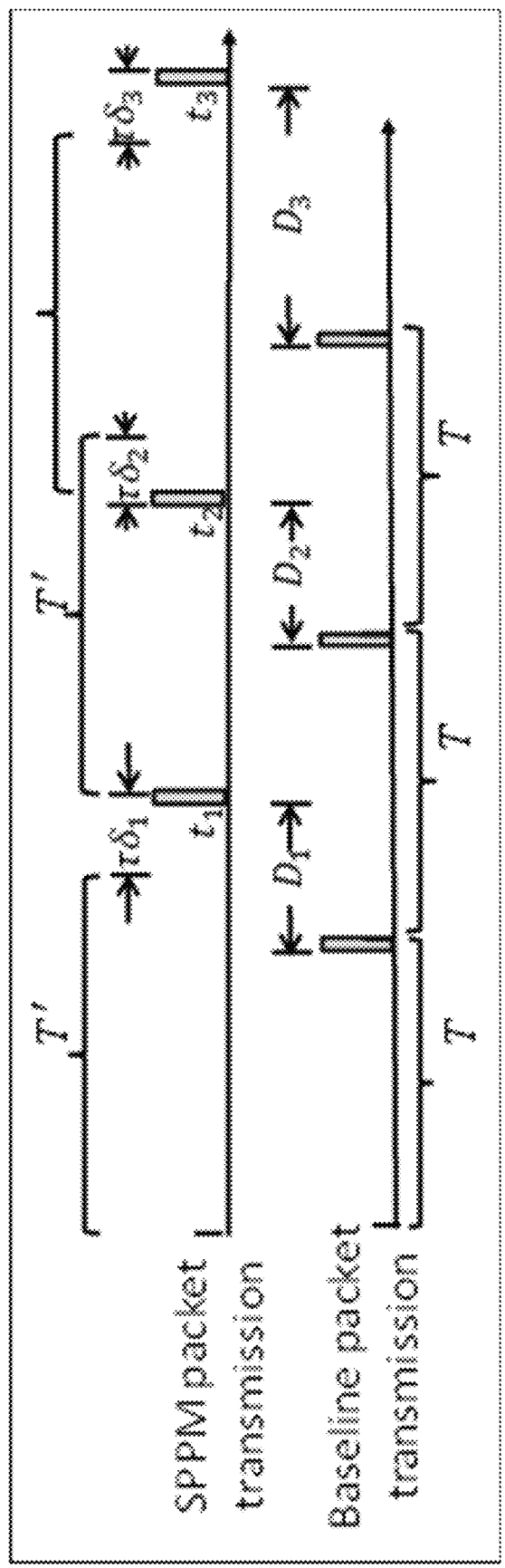
FIG. 13 is a time chart depicting a definition for time shift distance.

FIG. 13 shows the schematic of the definition for time shift distance D. In FIG. 13, a sensor node does not have enough energy to prepone the first packet at the time $T'-\tau\delta_1$, it postpones sending the first packet until the time $t_1=T'+\tau\beta_1$. The distance for the first packet is $D=(t_1-T)/\tau+L$ in bit durations and the energy level is $D_1\tau W$. Similarly, the distances for the second and the third packets are $D_2=(t_2-2T)/\tau+L$ and $D_2=(t_3-3T)/\tau+L$ bit durations, respectively, and the corresponding energy levels are $D_2\tau W$ and $D_3\tau W$, respectively.

The general expression for the distance of the packet is $D_i=(t_i-iT)/\tau+L$. Due to the definition for baseline packet transmission, the baseline inter-packet interval T is the minimum time interval between two packets on average. Therefore, $D_i$ is always larger or equal to zero. The maximum distance $D_i=\Delta+\Delta-1=2\Delta-1$, which can be obtained from the fact that the three consecutive distances are $D_{i-2}=0$, $D_{i-1}=\Delta-1$ with cumulative energy level $(\Delta-1)\tau W$ (postponing $\Delta-1$ bit durations), and $D_i=2\Delta-1$ with cumulative energy level $(2\Delta-1)\tau W$ (postponing $\Delta$ bit durations), respectively. The distance D defines $2\Delta$ states (from 0 to $2\Delta-1$) in a state machine, which represents the packet position during SPPM, and the transition between the states depends on the available energy level and time shift parameter $\Delta$.

Take $$\Delta = \frac{T}{\tau}$$

for instance, namely T'=T. When the distance of a packet is D=0 (the present state is 0), the probability vector that the packet transits from state 0 to all the other states (0, 1, ..., $2\Delta-1$) where the next packet transmission can appear is $$[0, \overbrace{\frac{1}{\Delta}, \frac{1}{\Delta}, \ldots, \frac{1}{\Delta}}^{\Delta}, 0, 0, \ldots, 0] \quad (9)$$

where the vector in Eq. (9) means that the state 0 can transit to the state 1, 2, ..., $\Delta$ with the probability $$\frac{1}{\Delta}.$$

Similarly, when the present packet position is D=1, the probability vector that the packet position transits from state 1 to all the other states (0, 1, ..., $2\Delta-1$) where the next packet transmission can appear is:

$$[\frac{1}{\Delta}, 0, 0, \overbrace{\frac{1}{\Delta}, \ldots, \frac{1}{\Delta}}^{\Delta+2}, 0, 0, \ldots, 0] \quad (10)$$

where the above transition vector is obtained from the analysis of cumulated energy.

Since the present state is D=1, which can be considered as the packet is postponed for one bit duration from state D=0, and thus the present energy level at D=1 is $E_{D=1}=1\cdot\tau\cdot W=\tau W$. Based on the PPM rules, the next state of packet position cannot be the state 2, because if the energy level is enough, the prepone of the packet is preferred instead of postponing. Simultaneously, about the next states of the state 1, it cannot be itself due to the definition of PPM. Therefore, the vector in Eq. (10) is obtained about the transition probability of the state 1 to all the other states where the next packet transmission can appear.

When the state of packet position D=i ($0 \le i \le 2\Delta-1$) and $2i < 2\Delta-1$, the probability that the state transits from D=i to D=i+1, i+2, . . . , 2i is equal to zero because the packet is preponed if energy level is available. When a data value $\delta$ ($\delta > i$) is modulated with a packet, the probability that the state transits from D=i to D=2i+1, 2i+2, . . . , $\Delta$+i is $$\frac{1}{\Delta}$$

because the harvested energy is not enough to support preponing the packet with the value $\delta > i$ and the postpone is necessary for modulating $\delta$ with packet. Since the maximum value of modulated data is $\delta \le \Delta-1$, the state D=i has zero probability to convert itself to the state D=$\Delta$+i+1, $\Delta$+i+2, . . . , $2\Delta-1$. In conclusion, the probability vector that the packet position transits from state i ($2i < 2\Delta-1$) to all the other states (0, 1, . . . , $2\Delta-1$) for the next packet transmission is shown in Eq. (11):

$$[\underbrace{\frac{1}{\Delta}, \frac{1}{\Delta}, \ldots, \frac{1}{\Delta}}_{i-1}, \underbrace{0, 0, \ldots, 0}_{i+1}, \underbrace{\frac{1}{\Delta}, \frac{1}{\Delta}, \ldots, \frac{1}{\Delta}}_{\Delta-i}, \underbrace{0, 0, \ldots, 0}_{\Delta-i-1}] \quad (11)$$

When the state of packet position D=i ($0 \le i \le 2\Delta-1$) and $2i \ge 2\Delta-1$, the probability vector that the packet position transits from state i to all the other states (0, 1, . . . , $2\Delta-1$) for the next packet transmission is shown in Eq. (12):

$$[\underbrace{0, 0, \ldots, 0}_{i-\Delta}, \underbrace{\frac{1}{\Delta}, \frac{1}{\Delta}, \ldots, \frac{1}{\Delta}}_{\Delta}, \underbrace{0, 0, \ldots, 0}_{2\Delta-i-1}] \quad (12)$$

A comprehensive one-step transmission matrix between $2\Delta-1$ states can be drawn based on the above analysis as:

$$\begin{array}{c} \\ 0 \\ 1 \\ \vdots \\ \Delta-1 \\ \Delta \\ \Delta+1 \\ \vdots \\ 2\Delta-1 \end{array} \begin{array}{c} 0 \quad 1 \quad 2 \quad 3 \quad \ldots \quad \Delta-1 \quad \Delta \quad \Delta+1 \quad \Delta+2 \quad \ldots \quad 2\Delta-2 \quad 2\Delta-1 \\ \begin{bmatrix} 0 & 1/\Delta & 1/\Delta & 1/\Delta & \ldots & 1/\Delta & 1/\Delta & 0 & 0 & \ldots & 0 & 0 \\ 1/\Delta & 0 & 0 & 1/\Delta & \ldots & 1/\Delta & 1/\Delta & 1/\Delta & 0 & \ldots & 0 & 0 \\ \vdots & \vdots & \vdots & \vdots & \ddots & \vdots & \vdots & \vdots & \vdots & \ddots & \vdots & \vdots \\ 1/\Delta & 1/\Delta & 1/\Delta & 1/\Delta & \ldots & 0 & 0 & 0 & 0 & \ldots & 0 & 1/\Delta \\ 1/\Delta & 1/\Delta & 1/\Delta & 1/\Delta & \ldots & 1/\Delta & 0 & 0 & 0 & \ldots & 0 & 0 \\ 0 & 1/\Delta & 1/\Delta & 1/\Delta & \ldots & 1/\Delta & 1/\Delta & 0 & 0 & \ldots & 0 & 0 \\ \vdots & \vdots & \vdots & \vdots & \ddots & \vdots & \vdots & \vdots & \vdots & \ddots & \vdots & \vdots \\ 0 & 0 & 0 & 0 & \ldots & 1/\Delta & 1/\Delta & 1/\Delta & 1/\Delta & \ldots & 1/\Delta & 0 \end{bmatrix} \end{array} = P \quad (13)$$

where the transition matrix P in Eq. (13) shows one-step transition probability of Markov chain [20] between $2\Delta$ states with $\Sigma_{j=1}^{2\Delta} p_{ij} = 1$.

For any two states a and b (a, b $\in \{D_0, D_1, \ldots, D_{2\Delta-1}\}$), it is possible to transfer to any state from any other state ($p_{ij} \ge 0$). Therefore, the corresponding Markov Chain $\{x_n\}$ (n=0, 1, . . . , $x_n \in \{D_0, D_1, \ldots, D_{2\Delta-1}\}$) of the matrix P is irreducible. A state a has period k=1 if any return to state a must occur in multiples of k time steps, the state is said to be aperiodic. For example, consider starting at a state $D_2$ travelling along the arrows, and ending back at $D_2$ in 2 steps ($D_2 \to D_1 \to D_2$), or 3 steps ($D_2 \to D_4 \to D_1 \to D_2$), so state 2 is aperiodic. If An irreducible Markov chain only needs one aperiodic state to imply all states are aperiodic. If a Markov chain is irreducible and aperiodic, it has a limiting probability which is the unique solution of $\pi=\pi P$. $\pi$ is the equilibrium distribution of the chain, and it is also the steady-state distribution of packet position from a Tx-only sensor node. If the initial position of nodes is known in the timeline, the packet positions of each node can be drawn through the above analysis, and the probability for packet position at each state can be determined by calculating the equilibrium distribution $\pi$.

The equilibrium distribution $\pi$ describes the theoretical analysis of packet position distribution of two nodes, which completely agrees with the simulation results. The overlapping area of PMF between two nodes' packets are collision area, which is the big impact on the performance of information transfer capacity for a Tx-only network.

As described above, it is known that $$T' = \left(\frac{2L \cdot E}{W \cdot \tau} - 2L + 1\right)\tau$$

is corresponding to the maximum information transfer capacity with a single Tx-only sensor, and the average inter-packet interval is equal to T. Since packets from all the nodes are randomly distributed in a packet frame T, collision cannot be avoided. The collision probability can be analyzed according to the overlapping areas of packet position from different transmitters.

Since the packet position distribution can be obtained through the transition matrix in Eq. (13), the steady-state for the Markov chain w can be calculated by getting non-zero solution vector of the linear homogeneous system of equations $\pi=\pi P$. The solution vector is the equilibrium distribution of packet position and can be easily checked by inserting the solution $\pi$ in the equation to see if w satisfies the equation $\pi=\pi P$.

Sensor nodes are randomly distributed in a packet frame T. To calculate the collision probability for a node, assume that time shift parameter $\Delta$ (in bit durations) is used for each node during SPPM, the maximum value can be achieved when $$\Delta \leq \frac{2L \cdot E}{W \cdot \tau} - 2L + 1.$$

N number of nodes with the node Ids$\in$[1,N] are randomly distributed within the packet frame T, the states (packet position) for each node is defined as $[D_0^{(1)}, D_1^{(1)}, \ldots, D_{2\Delta-1}^{(1)}]$ for Node-1, the states $$\left[D_{\frac{T}{\tau N}}^{(2)}, D_{\frac{T}{\tau N}+1}^{(2)}, \ldots, D_{\frac{T}{\tau N}+2\Delta-1}^{(2)}\right]$$

for Node-2, and so on, the states $$\left[D_{\frac{T(N-1)}{\tau N}}^{(N)}, D_{\frac{T(N-1)}{\tau N}+1}^{(N)}, \ldots, D_{\frac{T(N-1)}{\tau N}+2\Delta-1}^{(N)}\right]$$

for Node-N. For example, when N=2 and $\Delta$=240 bit durations, the states range for all the nodes is from 0 to $$\frac{T(N-1)}{\tau N} + 2\Delta - 1 = 599 \text{ bit durations.}$$

The probability of packet position of each node across the overall states for all the nodes is defined as:

$$\begin{cases} \left[P_{D_0}^{(1)}, P_{D_1}^{(1)}, \ldots, P_{D_{2\Delta-1}}^{(1)}, \ldots P_{D_{\frac{T(N-1)}{\tau N}+2\Delta-1}}^{(1)}\right] \\ \left[P_{D_0}^{(2)}, P_{D_1}^{(2)}, \ldots, P_{D_{\frac{T}{\tau N}}}^{(2)}, \ldots P_{D_{\frac{T(N-1)}{\tau N}+2\Delta-1}}^{(2)}\right] \\ \vdots \\ \left[P_{D_0}^{(N)}, P_{D_1}^{(N)}, \ldots, P_{D_{2\Delta-1}}^{(N)}, \ldots P_{D_{\frac{T(N-1)}{\tau N}+2\Delta-1}}^{(N)}\right] \end{cases} \quad (14)$$

The probability of each node's packet at all the possible packet positions in the whole network has been listed above for the purpose of collision probability calculation. Starting the analysis from the signal node and take Node-1, for example. First, calculate the collision probability of two nodes (Node-1 and Node-2). Assume that when the packet from Node-1 appears at state $D_i$, collision can only happen when the packet from Node-2 appear at states between $D_{i-L+1}$ and $D_{i+L-1}$. Since collision between two nodes are considered, all the other nodes, except Node-1 and Node-2, should not appear between $D_{i-L+1}$ and $D_{i+L-1}$. Therefore, the collision probability between Node-1 and Node-2 is expressed as:

$$P_{D_i}^{(1)}\left(\sum_{D_j \in [D_{i-L+1}, D_{i+L-1}]} P_{D_j}^{(2)}\right) \quad (15)$$

$$\left(\prod_{a \in [1,N] \setminus \{1,2\}} \left(\sum_{D_k \in [0, \frac{T(N-1)}{\tau N}+2\Delta-1] \setminus [D_{i-L+1}, D_{i+L-1}]} P_{D_k}^{(a)}\right)\right)$$

where $a \in [1, N] \setminus \{1,2\}$ denotes $a \in [1, N]$ and $a \notin \{1,2\}$, the complement of $\{1,2\}$ in $[1, N]$. It is the same meaning for the expression $$D_k \in \left[0, \frac{T(N-1)}{\tau N} + 2\Delta - 1\right] \setminus [D_{i-L+1}, D_{i+L-1}].$$

Since the collision probability of the packets between Node-1 and Node-2 is calculated in Eq. (15), the collision probability of the packets between Node-1 and one of any other nodes can also be calculated accordingly as:

$$P_{D_i}^{(1)}\left(\sum_{D_j \in [D_{i-L+1}, D_{i+L-1}]} P_{D_j}^{(b)}\right) \quad (16)$$

$$\left(\prod_{a \in [1,N] \setminus \{1,b\}} \left(\sum_{D_k \in [0, \frac{T(N-1)}{\tau N}+2\Delta-1] \setminus [D_{i-L+1}, D_{i+L-1}]} P_{D_k}^{(a)}\right)\right)$$

The above calculates in Eq. (16) shows the collision probability of Node-1 with one of any other nodes when the packets from Node-1 appear at state $D_0$. Similarly, the collision probability of Node-1 with one of any other nodes when the packets from Node-1 appear at all the states $$D_0, D_1, \ldots D_{\frac{T(N-1)}{\tau N}+2\Delta-1}$$

can be expressed as:

$$P_2^{(1)} = \sum_{D_i=D_0}^{D_{\frac{T(N-1)}{\tau N}+2\Delta-1}} P_{D_i}^{(1)}\left(\sum_{\substack{D_j \in [D_{i-L+1}, D_{i+L-1}] \\ b \neq 1}} P_{D_j}^{(b)}\right) \quad (17)$$

$$\left(\prod_{a \in [1,N] \setminus \{1,b\}} \left(\sum_{D_k \in [0, \frac{T(N-1)}{\tau N}+2\Delta-1] \setminus [D_{i-L+1}, D_{i+L-1}]} P_{D_k}^{(a)}\right)\right)$$

Second, the probability $P_3^{(1)}$ of the packets from Node-1 collided with the packets from two of any other nodes together can be according to the above analysis and be expressed as:

$$P_3^{(1)} = \sum_{D_i=D_0}^{D_{\frac{T(N-1)}{\tau N}+2\Delta-1}} P_{D_i}^{(1)} \quad (18)$$

$$\left(\sum_{\substack{D_j \in [D_{i-L+1}, D_{i+L-1}] \\ b \neq 1}} P_{D_j}^{(b)} \sum_{\substack{D_j \in [D_{i-L+1}, D_{i+L-1}] \\ c \neq 1}} P_{D_j}^{(c)}\right) *$$

$$\left(\prod_{a \in [1,N] \setminus \{1,b,c\}} \left(\sum_{D_k \in [0, \frac{T(N-1)}{\tau N}+2\Delta-1] \setminus [D_{i-L+1}, D_{i+L-1}]} P_{D_k}^{(a)}\right)\right)$$

Third, the probability of the packets from Node-1 collided with the packets from 3, 4, . . . , (N−1) of any other nodes together can be deduced accordingly as $P_4^{(1)}, P_5^{(1)}, \ldots, P_N^{(1)}$. Finally, the collision matrix of all the nodes can be expressed as:

$$\begin{cases} [P_2^{(1)}, P_3^{(1)}, \ldots, P_N^{(1)}] \\ [P_2^{(2)}, P_3^{(2)}, \ldots, P_N^{(2)}] \\ \vdots \\ [P_2^{(N)}, P_3^{(N)}, \ldots, P_N^{(N)}] \end{cases} \qquad (19)$$

When M number of packets are sent by N number of nodes, each node sends $$\frac{M}{N}$$

number of packets due to the same energy utilization rate. The collided number of packets from all the nodes can be calculated as:

$$\frac{M}{N}(P_2^{(1)} + P_3^{(1)} + \ldots + P_N^{(1)}) + \qquad (20)$$
$$\frac{M}{N}(P_2^{(2)} + P_3^{(2)} + \ldots + P_N^{(2)}) + \ldots + \frac{M}{N}(P_2^{(N)} + P_3^{(N)} + \ldots + P_N^{(N)})$$

The collision probability for a network with N number of nodes is:

$$\left(\frac{M}{N}(P_2^{(1)} + P_3^{(1)} + \ldots + P_N^{(1)}) + \frac{M}{N}(P_2^{(2)} + P_3^{(2)} + \ldots + P_N^{(2)}) + \right. \qquad (21)$$
$$\left. \ldots + \frac{M}{N}(P_2^{(N)} + P_3^{(N)} + \ldots + P_N^{(N)}) \right) \cdot \frac{1}{M} = \frac{1}{N}\sum_{x=1}^{N}\sum_{y=2}^{N} P_y^{(x)}$$

Note that the information transfer capacity for the whole network can be calculated using Eq. (4), Eq. (6), Eq. (7) and Eq. (21) according to the choosing of time shift parameter $\Delta$. The collision probability in Eq. (15), Eq. (16), Eq. (17), Eq. (18) and Eq. (21) involves the collision calculation from between two packets to between N packets, packet positions go through all the states, and collision probability for all the nodes. However, since the packets from a node cannot appear at all the states, half of values in the probability matrix Eq. (14) are equal to zero. For example, the packets from Node-1 can never appear at states $$D_{2\Delta}, D_{2\Delta+1}, \ldots, D_{\frac{T(N-1)}{\tau N}+2\Delta-1}.$$

Therefore, the probability of the packets from Node-1 appearing at the above states is equal to zero, namely, $$P_{D_{2\Delta}}^{(1)} = P_{D_{2\Delta+1}}^{(1)} = P_{D_{\frac{T(N-1)}{\tau N}+2\Delta-1}}^{(1)} = 0.$$

These zero values in the probability matrix of Eq. (14) can reduce the computational complexity in Eq. (15), Eq. (16), Eq. (17) and Eq. (18).

For a Tx-only network application with a group of parameters (E, τ, W, N and L), how to design time shift parameter $\Delta$ to maximize the information transfer capacity is important. First, the baseline inter-packet interval is used to set the value of $\Delta$ with $\Delta=\Delta_T$. Based on the present value $\Delta(\Delta=\Delta_T)$, the effective information capacity $\eta_{\Delta=\Delta_T}$ can be calculated as follows using Eq. (4) and Eq. (21):

$$\eta_{\Delta=\Delta_T} = \left(1 - \frac{1}{N}\sum_{x=1}^{N}\sum_{y=2}^{N} P_y^{(x)}\right) \cdot \frac{L + \frac{\log_2(\Delta!)}{\Delta}}{\frac{L \cdot E}{W}} \bigg/ \left(\frac{W}{E}\right) \qquad (22)$$

$$= \frac{1}{N}\sum_{x=1}^{N}\sum_{y=2}^{N} P_y^{(x)} \cdot \frac{L + \frac{\log_2(\Delta!)}{\Delta}}{L}$$

If the value $\eta_{\Delta=\Delta_T}$ is less than one, this means that collision has significantly reduced the information capacity of SPPM. The optimal value of $\Delta$ falls in the range of $$\left[\frac{T}{2\tau N}, \frac{T}{\tau N}\right],$$

which can be found through the calculation of effective information capacity $\eta_\Delta$ using Eq. (4) and Eq. (21).

If the value $\eta_{\Delta=\Delta_T}$ is greater than one, the optimal value of $\Delta$ either falls in the range of $$\left[\frac{T}{\tau N}, \frac{T}{\tau}\right]$$

or is equal to $$\frac{2L \cdot E}{W \cdot \tau} - 2L + 1.$$

After comparison of effective information capacity between these two possible values, the optimal time shift parameter $\Delta$ can be assigned accordingly.

The algorithm about searching for the optimal time shift parameter $\Delta$ to maximum of the information transfer capacity using SPPM is given. Step 1: calculate the effective information capacity $\eta_{\Delta=\Delta_T}$ when $\Delta=\Delta_T$ using Eq. (22); If $\eta_{\Delta=\Delta_T}=1$, go to step 4. Otherwise, go to step 2 to calculate the effective information capacity $\eta_\Delta$ when $$\Delta \in \left[\frac{T}{\tau N}, \frac{T}{\tau}\right]$$

using Eq. (22), and find the maximum $\eta_{\Delta_1}$ and the corresponding time shift value $\Delta_1$. Then, go to step 3 and calculate the effective information capacity $\eta_{\Delta_2}$ when $$\Delta_2 = \frac{2L \cdot E}{W \cdot \tau} - 2L + 1.$$

Compare the two values of effective information capacity $\eta_{\Delta_1}$ and $\eta_{\Delta_2}$. If $\eta_{\Delta_1} \geq \eta_{\Delta_2}$, then the optimal time shift $\Delta_{opt}=\Delta_1$. If $$\eta_{\Delta_1} < \eta_{\Delta_2}, \Delta_{opt} = \Delta_2 = \frac{2L \cdot E}{W \cdot \tau} - 2L + 1.$$

Next, go to step 5. At step 4, calculate the effective information capacity $\eta_\Delta$ when $$\Delta \in \left[\frac{T}{2\tau N}, \frac{T}{\tau N}\right]$$

using Eq. (22), and find the maximum $\eta_{\Delta_1}$ and the corresponding time shift value $\Delta_1$. The optimal time shift $\Delta_{opt} = \Delta_1$. Go to step 5. Step 5 includes outputting the optimal time shift parameter $\Delta_{opt}$ and the corresponding maximum effective information capacity $\eta_{\Delta_{opt}}$.

Performance Analysis of SPPM

As shown above, a complete analysis has been developed to enhance the information capacity of sensor network without using extra energy. The obtained information capacity using SPPM is always greater than the baseline information capacity. The evaluation is implemented from two perspectives about how the time shift parameter and number of nodes affect the information transfer capacity. The effective information capacity concept is also used for the comparison purpose between SPPM information transfer capacity and the baseline one.

Note that energy utilization rate W=0.8 mW is used in the analysis, which corresponds to the baseline inter-packet interval is 1.6 seconds. However, the inter-packet interval is at least in the ranges of tens of seconds in the real hardware implementation, which can more significantly benefit the performance of SPPM. A relatively small inter-packet interval here is only for analysis purpose.

Figure 14B:
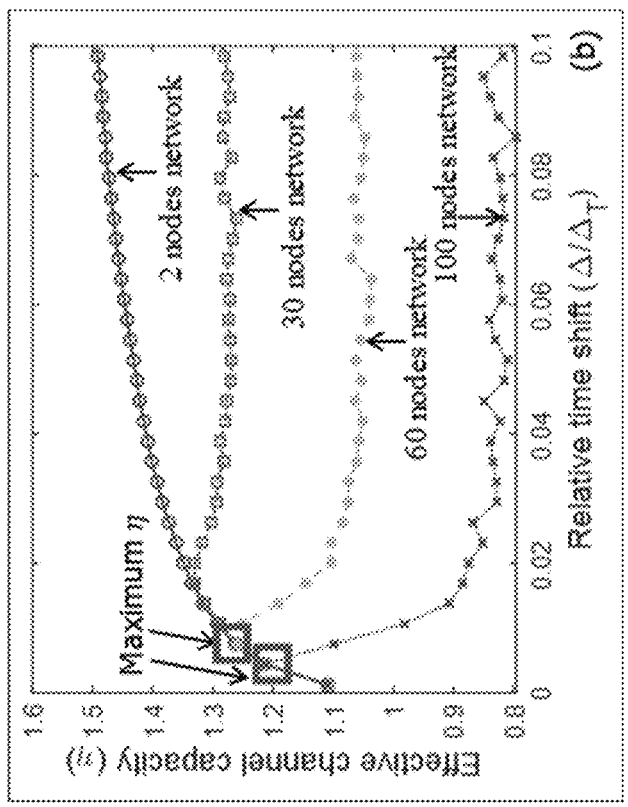
FIGS. 14A-14B are graphical depictions showing changes in effective information capacity with an increasing time shift.
Figure 14A:
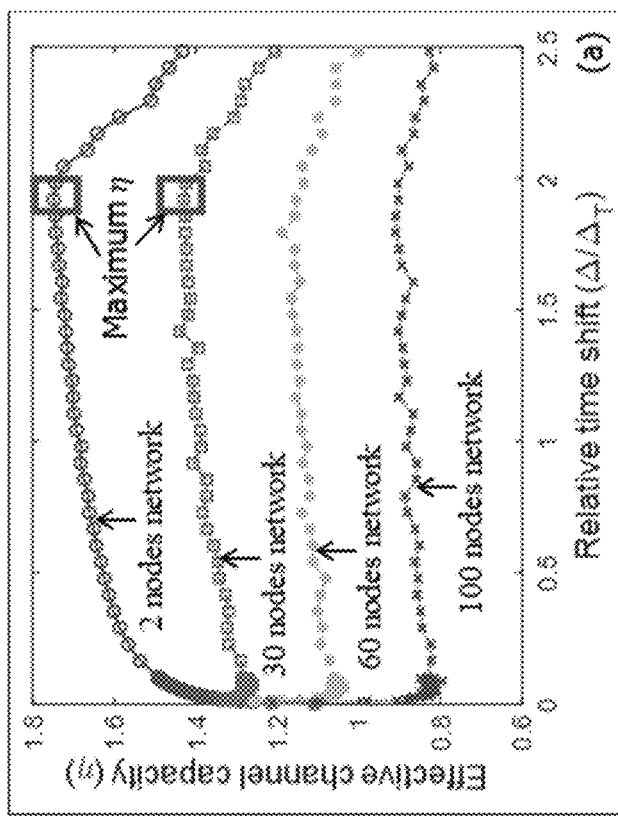

FIG. 14A shows the changes of effective information capacity with the increasing of time shift $\Delta$. FIG. 14B describes part of FIG. 14A with the range of $$\frac{\Delta}{\Delta_T} \in [0, 0.1].$$

It can be seen in FIG. 14A that the maximum effective channel can be obtained at the same value of $\Delta$, actually $$\Delta = \frac{2L \cdot E}{W \cdot \tau} - 2L + 1.$$

Figure 15:
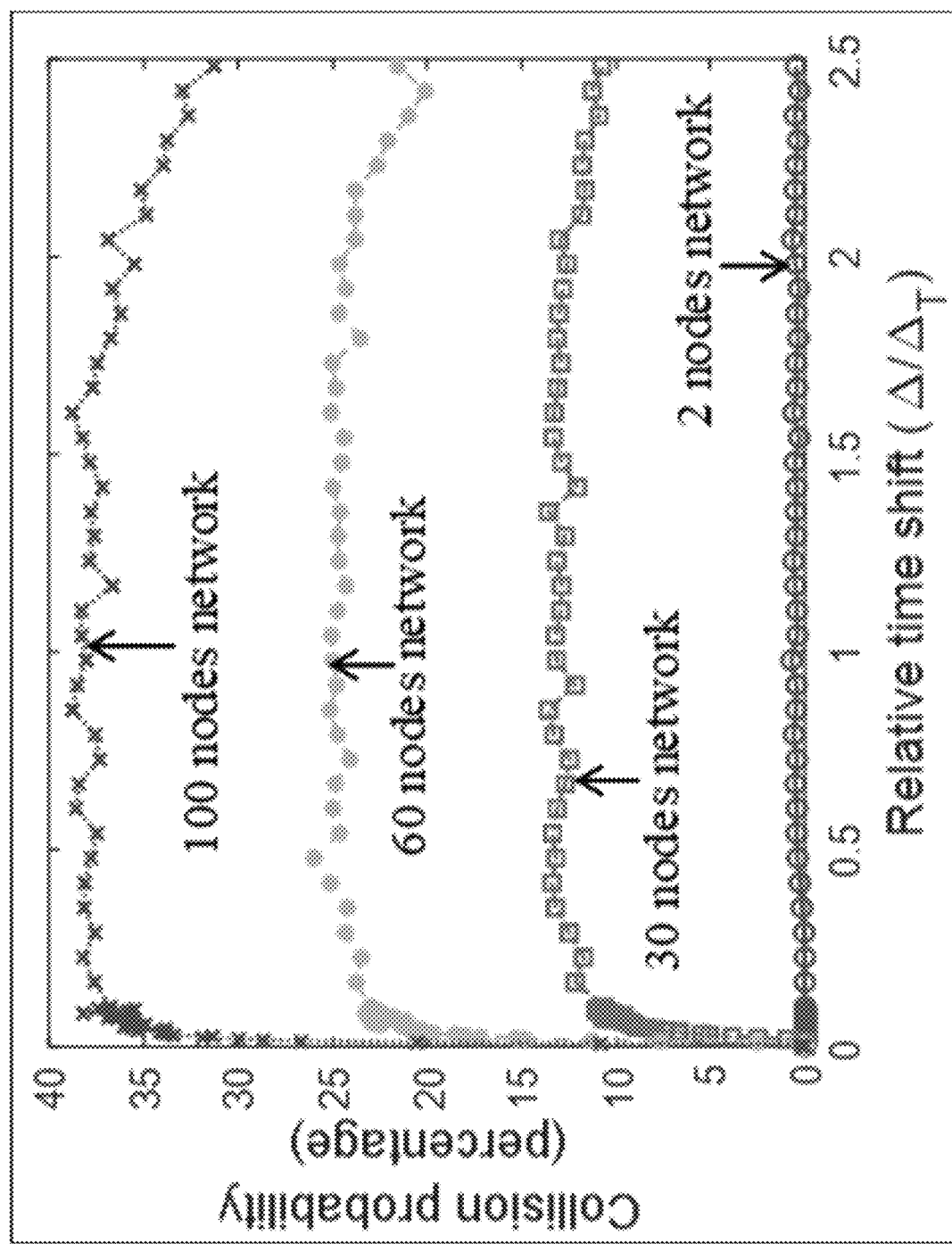
FIG. 15 is a graphical depiction showing changes in collision probability with an increasing time shift.

Because when $$\frac{\Delta}{\Delta_T} \in \left[1, 2 - \frac{2L-1}{\Delta_T}\right],$$

the increasing of $\Delta$ within the range leads to the increasing of packet distributed area (occupies more states), a wider area of packet distribution does not incur the increasing of collision probability which can be verified in FIG. 15 that the collision probability for $$\frac{\Delta}{\Delta_T} \in \left[1, 2 - \frac{2L-1}{\Delta_T}\right]$$

remains the same value. However, when $$\frac{\Delta}{\Delta_T} > 2 - \frac{2L-1}{\Delta_T},$$

even though the collision probability is decreasing due to the wider area of packet position distribution, the average inter-packet interval is increasing accordingly, which incurs the decreasing of effective information capacity. Therefore, the number of nodes in a network does not affect the value of optimal time shift $\Delta$.

Whether the time shift $\Delta = 2\Delta_T - 2L + 1$ is global optimal solution or local one, it depends on the collision probability. If a large collision probability worsens the effective information capacity as shown in FIG. 15 with one hundred nodes, and the effective information capacity is even less than 1, the value $$\Delta = 2 - \frac{2L-1}{\Delta_T}$$

turns out be the local optimal solution. The global optimal solution can only be achieved when $\Delta < \Delta_T$. Therefore, it can be seen in FIG. 14B that the optimal value of $\Delta$ is less than $0.1\Delta_T$. A relatively narrow packet position distribution can mitigate the impact of collision. For the situation of the effective information capacity greater than 1 when $\Delta = \Delta_T$, a further investigation is needed for optimal $\Delta$. For example, in FIGS. 14A and 14B, the optimal $\Delta$ for 30 nodes is within the range of $[0, \Delta_T]$, but the optimal $\Delta$ for 6 nodes is equal to $2\Delta_T - 2L + 1$, which is greater than $\Delta_T$.

Figure 16:
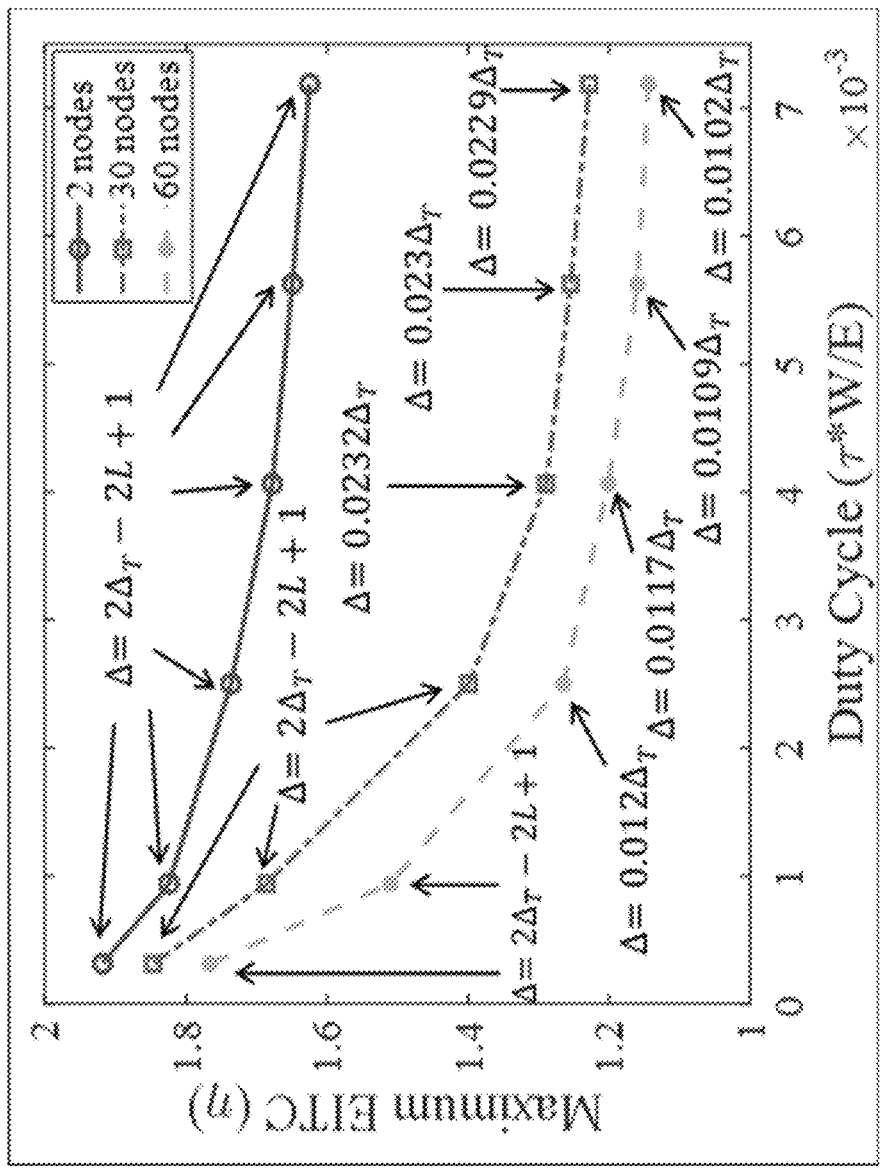
FIG. 16 is a graphical depiction showing a maximum Effective Information Transfer Capacity (EITC) reduces with higher duty cycles for different network sizes.

FIG. 16 shows how the maximum Effective Information Transfer Capacity (EITC) reduces with higher duty cycles for different network size. The baseline interval between two transmissions (i.e., T) determines the amount of free channel space available for the SPPM-WIS protocol to encode additional information by time-shifting the transmissions. The operating duty cycle is $L\tau/T$. Since $T = L \cdot E/W$, duty cycle can be expressed as $W \cdot \tau/E$. In other words, for a given bit duration, and per-bit transmission energy budget E, duty cycle is determined by the energy harvesting rate W. Lower harvesting rates would cause lower duty cycles.

For each point in FIG. 16, the value of time shifts for which the EITC is maximized is marked. This is because with higher duty cycles, lesser amount of shifting space is available coupled with more frequent inter-node collision. Also, for larger networks, the maximum EITC is smaller due to more frequent collisions.

Figure 17:
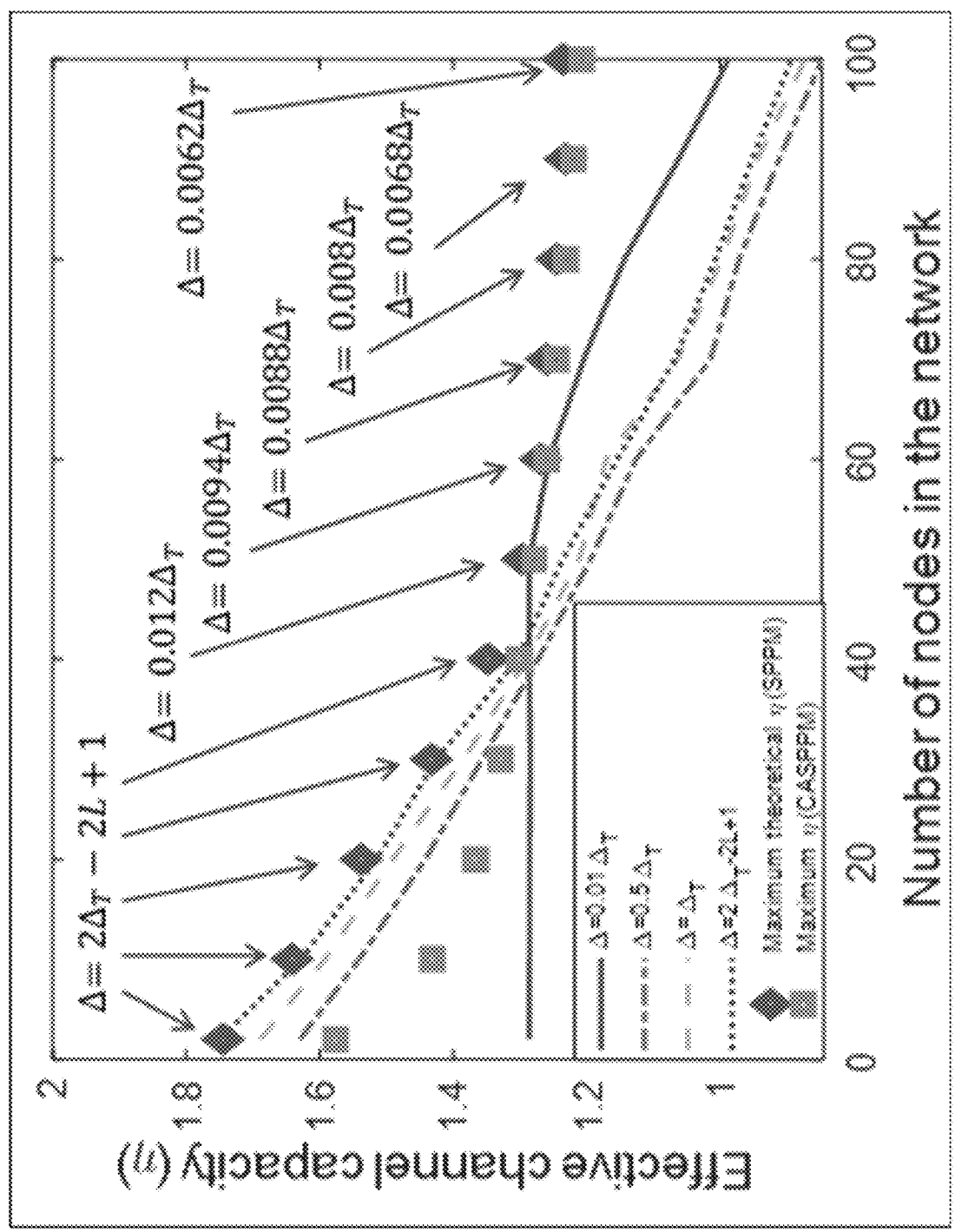
FIG. 17 is a graphical depiction showing changes in effective information capacity with an increasing number of nodes in a network.

FIG. 17 shows how the increasing of number of nodes or network size affects the effective information capacity and comparison between two protocols, CASPPM and SPPM. It can be seen in FIG. 17 that when the number of nodes in a network within a certain range (less than 40, for instance), there is a clear difference between different time shift parameters, the collision probability is also within a certain level (less than 20%) as shown in FIG. 18, the optimal time shift is always equal to $$\Delta = \frac{2L \cdot E}{W \cdot \tau} - 2L + 1$$

to achieve the maximum effective information capacity. Therefore, Fig. 17 shows that maximum theoretical effective information capacity η is highly overlapping with the curve for $$\Delta = \frac{2L \cdot E}{W \cdot \tau} - 2L + 1.$$

Less number of nodes can vastly benefit the performance of SPPM, and the present level of collision is not big enough to lessen the throughput of SPPM.

Figure 18:
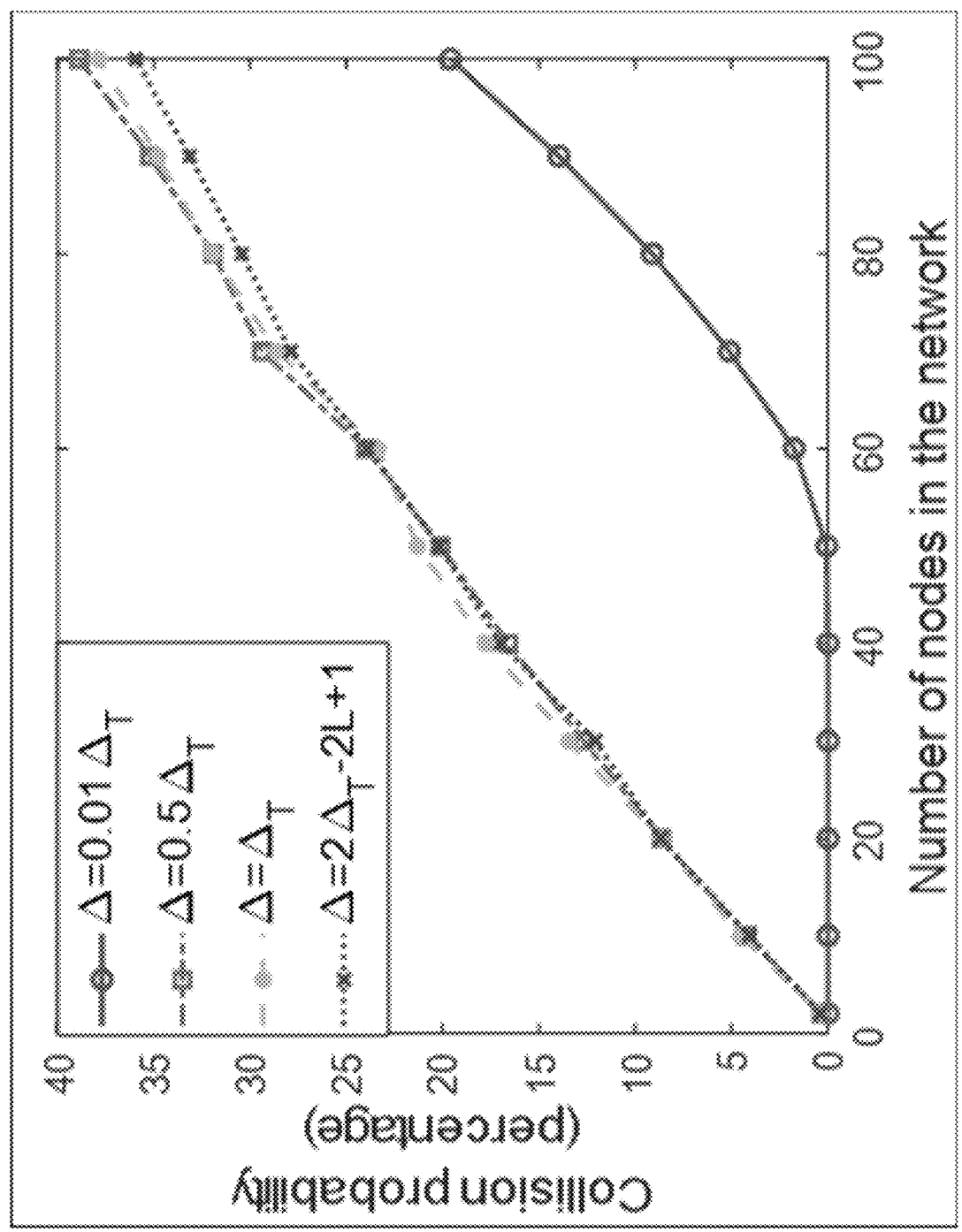
FIG. 18 is a graphical depiction showing changes in collision probability with an increasing number of nodes in a network.

When the number of nodes increases to large enough (larger than 50), more than 20% of packets collide when Δ is greater than $\Delta_T$ as shown in FIG. 18. With the increasing of the number of nodes, the information transfer capacity of SPPM is even less than the baseline one (ECC<1). The optimal time shift Δ for maximum η can only be obtained in the range of [0, $\Delta_T$], which tightens the packet position distribution within a smaller range and reduces the occurrence of collision. Therefore, the optimal time shift Δ is less than $\Delta_T$ and it keeps decreasing with the increasing of the number of nodes.

It can also be seen from FIG. 17 that the maximum η of SPPM is always greater than the maximum η of CASPPM. For a relatively small number of nodes in a network, according to the analysis in Section IV.B.3), the optimal Δ should be greater than $\Delta_T$. CASPPM protocol sets time shift Δ less than $\Delta_T$, which does not make best use of inter-packet interval to encode more data information. When a large number of nodes are in a network, CASPPM set a narrow range $$\left(\frac{T}{N}\right)$$

to allow the packet for position modulation, which constrains the modulation of data. However, a slightly greater modulation space can compensate the impact of collision from SPPM and achieves a greater information capacity. Therefore, it can be seen in FIG. 17 that the maximum ECC of SPPM is always slightly greater than the maximum ECC of CASPPM.

Figure 19:
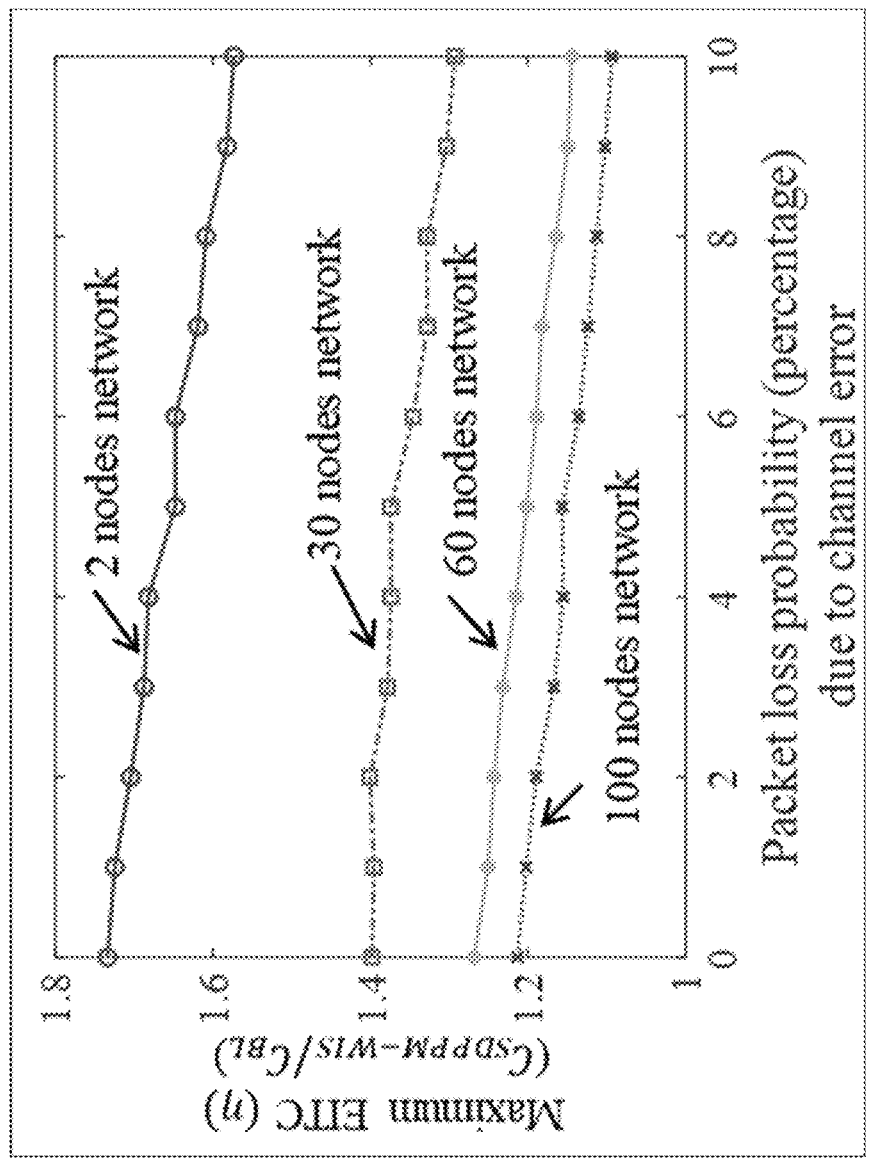
FIG. 19 is a graphical depiction of a maximum attainable effective information transfer capacity (EITC) of SPPM-WIS as a result of different packet loss probabilities due to channel errors.

A lost packet has two distinct effects on the effective information transfer capacity. First, the raw information contained within the packet is lost. Additionally, two separate pieces of the SPPM-coded information data is lost. One represented by the interval between the transmission times of the last packet and the lost packet, and the other represented by the interval between timings of the lost packet and the next packet. FIG. 19 reports the maximum attainable effective information transfer capacity (EITC) of SPPM-WIS as a result of different packet loss probabilities due to channel errors. The experiments for these results are run such that for a given network size, the shift value (i.e., Δ) that provides the maximum EITC is chosen.

As expected, the capacity diminishes monotonically with higher packet losses, although the values remain larger than one for up to 10% packet losses. Meaning SPPM-WIS still works better than the baseline case for up to 10% packet losses. It is notable that the decrease rate of EITC with higher packet losses are very similar for all network sizes. In summary, these results show that SPPM-WIS is deployable in networks with reasonable packet losses due to channel errors.

The techniques described herein or portions thereof may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A packet position modulation system comprising:
   a node configured to transmit a plurality of packets at corresponding time intervals, the node configured to adjust, for at least one packet of the plurality of packets, the corresponding time interval to transmit the at least one packet; and
   a base station configured to:
      receive the plurality of packets from the node at corresponding time intervals;
      determine a difference between a previous time that a previous packet of the plurality of packets was received and a present time that a present packet of the plurality of packets was received; and
      recover coded data from the present packet based on the difference.

2. The system of claim 1 wherein the node includes a transmit time device configured to:
   receive sensor data from a sensor of the node;
   determine a delay based on the sensor data;
   adjust the corresponding time interval based on the determined delay; and
   transmit the at least one packet in accordance with the adjusted time interval.

3. The system of claim 2 wherein the difference indicates the sensor data.

4. The system of claim 1 further comprising:
   an intermediary node including a transceiver and a sensor, the intermediary node configured to:
      receive the plurality of packets from the node; and
      forward the plurality of packets to the base station.

5. The system of claim 4 wherein the intermediary node includes an intermediary sensor configured to sense an environment condition at a location of the intermediary sensor.

6. The system of claim 1 wherein the node is configured to:
   select a reference interval, and
   in response to an energy level exceeding a threshold by:
      a present time equaling the reference interval less a next coded data, transmitting the present packet at the present time.

7. The system of claim 6 wherein the node is configured to:
   in response to the energy level being below the threshold by: the present time, transmitting the present packet at a postponed time, wherein the postposed time equals the reference interval plus the next coded data.

8. The system of claim 7 wherein the next coded data is a next data multiplied by a packet duration.

9. The system of claim 6 wherein:
   the reference interval is selected as greater than or equal to the corresponding time interval.

10. The system of claim 1 wherein:
    the node includes a sensor, and
    the plurality of packets include sensor data sensed by the sensor.

11. The system of claim 1 wherein the base station includes a memory coupled to a processor, wherein the memory stores instructions that, upon execution, cause the processor to recover the coded data and store the previous time that the previous packet of the plurality of packets was received.

12. The system of claim 1 wherein the base station includes a display configured to display the present packet and the recovered coded data.

13. A packet position modulation method comprising:
    transmitting, from a node, a plurality of packets at corresponding time intervals;
    adjusting, by the node, for a first packet of the plurality of packets, a first time interval that the first packet is transmitted;
    receiving, at a base station, the first packet of the plurality of packets from the node at the first time interval;
    determining a difference between a previous time that a previous packet of the plurality of packets was received and a present time that the first packet of the plurality of packets was received; and
    recovering coded data from the first packet based on the difference.

14. The method of claim 13 further comprising:
    storing the present time that the first packet of the plurality of packets was received as the previous time that the previous packet of the plurality of packets was received.

15. The method of claim 13 further comprising:
    receiving, at the node, sensor data from a sensor of the node;
    determining a time delay based on the sensor data and a remaining energy level;
    adjusting the first time interval of the first packet based on the determined time delay; and
    transmitting the first packet at the first time interval.

16. The method of claim 15 wherein the difference indicates the sensor data.

17. The method of claim 13 further comprising:
    receiving, at an intermediary node, the first packet from the node; and
    forwarding, from the intermediary node, the first packet to the base station.

18. The method of claim 17 wherein the intermediary node includes an intermediary sensor configured to sense an environment condition at a location of the intermediary sensor.

19. The method of claim 18 further comprising:
    generating an intermediary packet including the first packet and the environment condition sensed at the location of the intermediary sensor, wherein the environment condition is included in the intermediary packet as the coded data; and
    forwarding, from the intermediary node, the intermediary packet to the base station.

20. A packet position modulation system comprising:
    a node configured to transmit sensor data at corresponding time intervals, wherein the node includes a sensor and a transmit time device, wherein the transmit time device is configured to:
       receive sensor data from the sensor;
       determine a delay based on the sensor data and a remaining energy level;

adjust the corresponding time interval based on the delay; and transmit the sensor data in accordance with the adjusted time interval; and a base station configured to receive sensor data from the node at the corresponding time interval, wherein the base station includes a memory coupled to a processor, wherein the memory stores instructions that, upon execution, cause the processor to:

determine an actual period between receiving previous sensor data and the sensor data; and calculate the sensor data based on the actual period.

* * * * *